(12) United States Patent
Xu et al.

(10) Patent No.: US 7,640,502 B2
(45) Date of Patent: Dec. 29, 2009

(54) PRESENTATION FACILITATION

(75) Inventors: Ying-Qing Xu, Beijing (CN);
Heung-Yeung Shum, Beijing (CN);
Ya-Qin Zhang, Bellevue, WA (US);
Barn-Wan Li, San Jose, CA (US); Bo Liu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 503 days.

(21) Appl. No.: 10/957,037

(22) Filed: Oct. 1, 2004

(65) Prior Publication Data

US 2006/0075348 A1 Apr. 6, 2006

(51) Int. Cl.
*G06F 3/00* (2006.01)
*G06F 3/048* (2006.01)

(52) U.S. Cl. ........................... 715/730; 715/781
(58) Field of Classification Search ............... 715/781, 715/730
See application file for complete search history.

(56) References Cited

U.S. PATENT DOCUMENTS

| 5,917,480 | A | 6/1999 | Tafoya et al. |
| 6,008,807 | A | 12/1999 | Bretschneider et al. |
| 6,011,552 | A * | 1/2000 | Ramanathan et al. ....... 715/803 |
| 6,654,785 | B1 | 11/2003 | Craig |
| 6,728,753 | B1 | 4/2004 | Parasnis et al. |
| 2002/0036652 | A1 * | 3/2002 | Masumoto et al. .......... 345/732 |
| 2003/0105818 | A1 * | 6/2003 | Lapstun et al. ............... 709/204 |
| 2003/0189601 | A1 * | 10/2003 | Ben-Shachar et al. ....... 345/810 |
| 2004/0024819 | A1 * | 2/2004 | Sasaki et al. ................ 709/205 |
| 2004/0095378 | A1 * | 5/2004 | Vigue et al. ................. 345/723 |
| 2004/0179036 | A1 * | 9/2004 | Teplov et al. ............... 345/751 |
| 2004/0215731 | A1 * | 10/2004 | Tzann-en Szeto ........... 709/207 |
| 2005/0132299 | A1 * | 6/2005 | Jones et al. ................. 715/759 |
| 2006/0053380 | A1 * | 3/2006 | Spataro et al. .............. 715/753 |

OTHER PUBLICATIONS

"E-Class—a Multimedia and Web based Distance Learning System", Patel et al., Proceedings International Conference on Information Technology: Coding and Computing, 2002, pp. 524-528.

* cited by examiner

*Primary Examiner*—William L Bashore
*Assistant Examiner*—Stephen Alvesteffer
(74) *Attorney, Agent, or Firm*—Lee & Hayes, PLLC

(57) ABSTRACT

Multiple schemes and techniques for facilitating presentations with an interactive application are described. For example, an interactive application provides a console view overlay for integrating multiple productivity applications into a graphical user interface (GUI) window. An interactive application can also share a selected display portion of the console view overlay with other interactive applications. As another example, presenters and other audience members can draw on the selected display portion being shared, and the drawn graphics are synchronously displayed by the other interactive applications. Interactive applications, as directed by their users, can join various member groups and specific presentations thereof. Moreover, a user may share content in accordance with membership grouping.

31 Claims, 22 Drawing Sheets

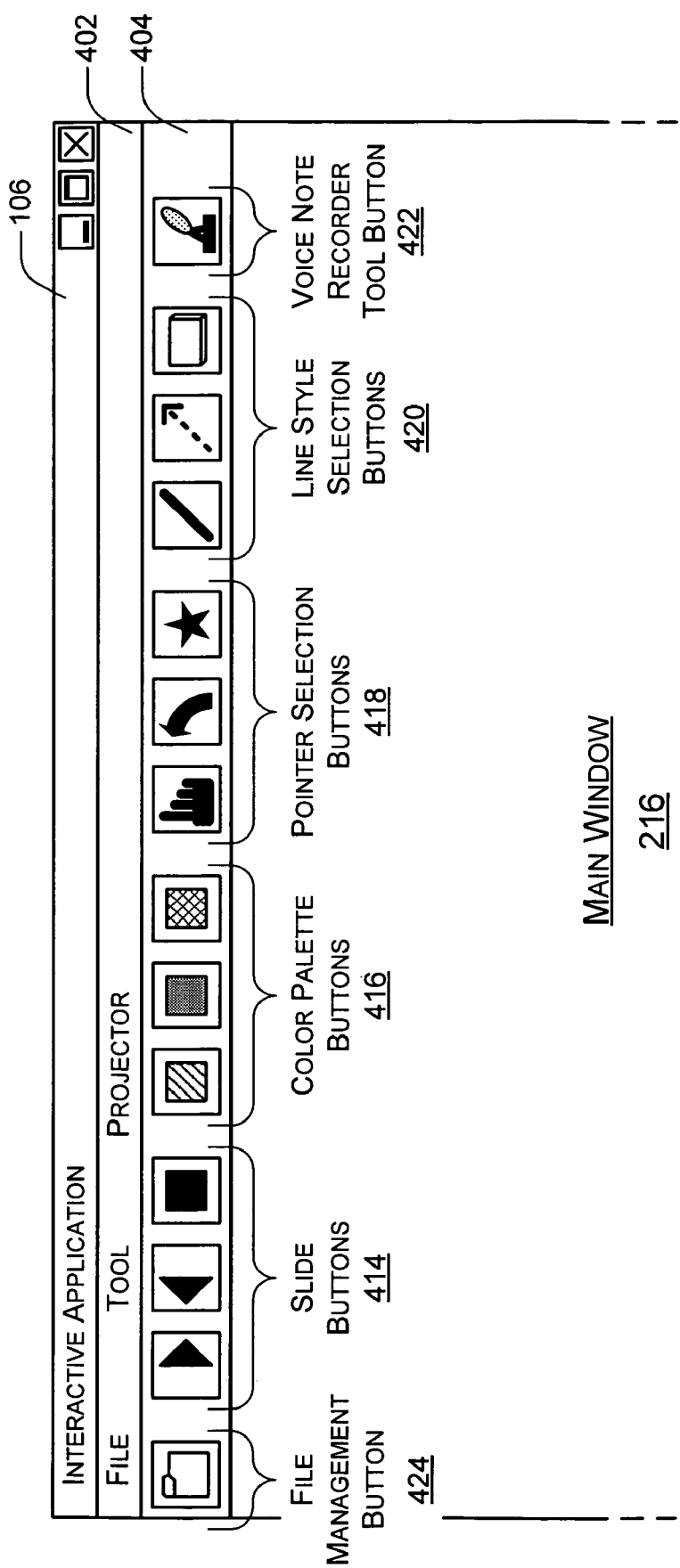

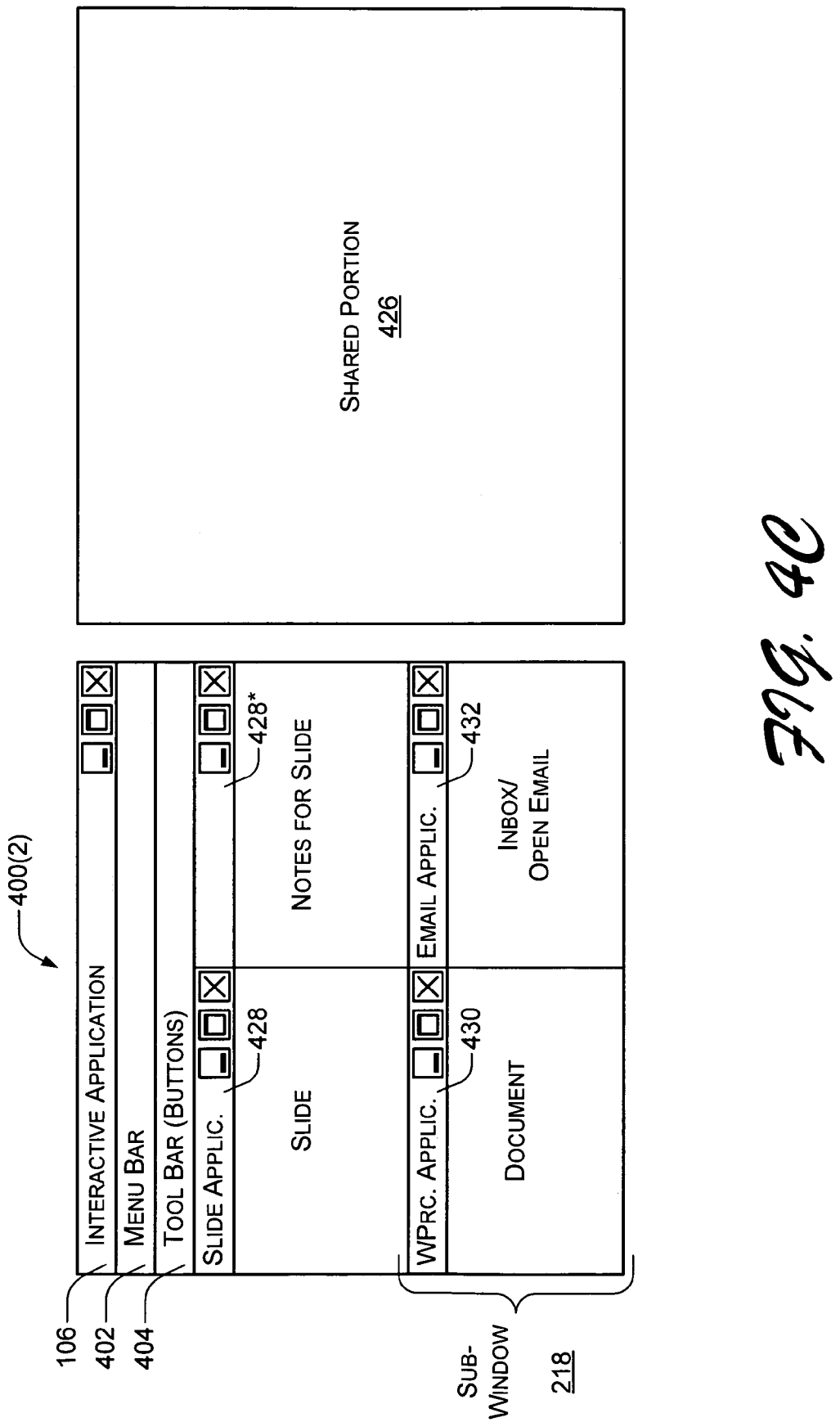

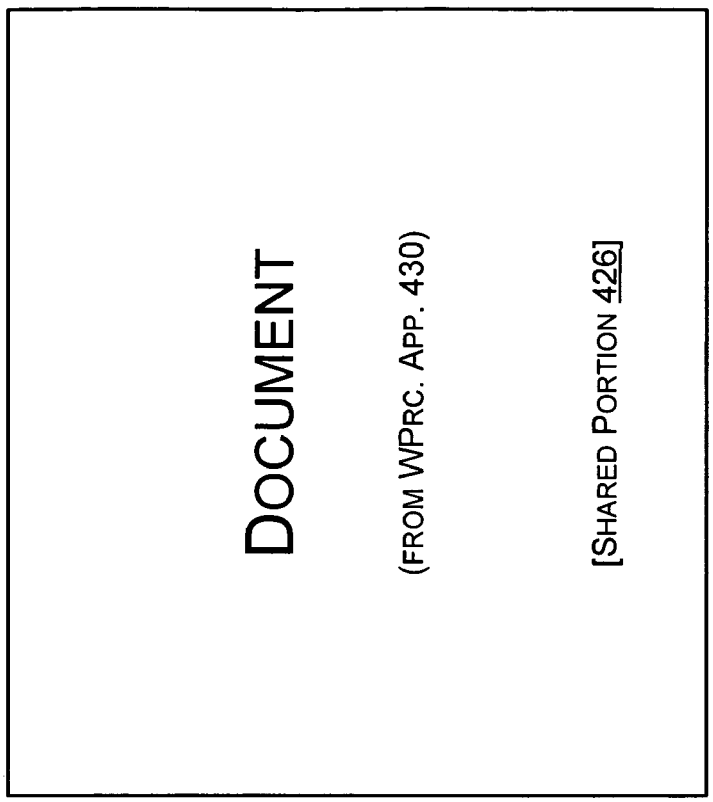
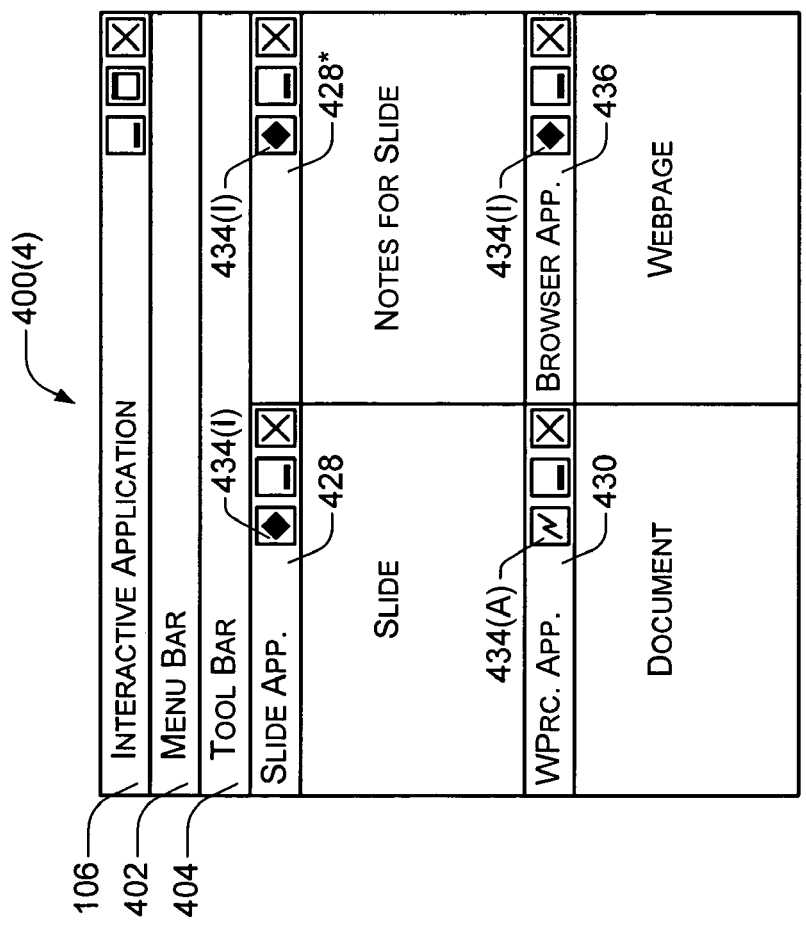

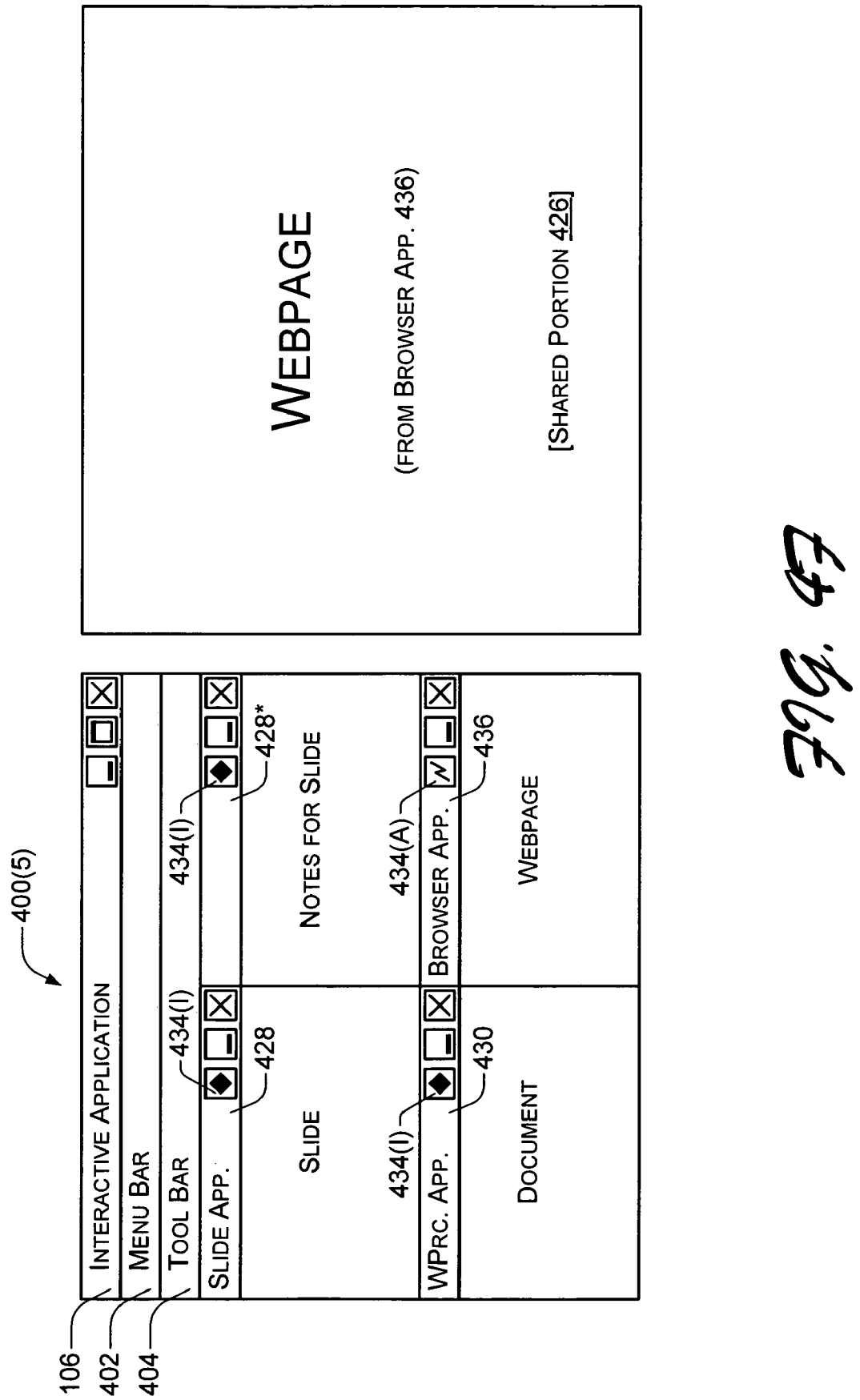

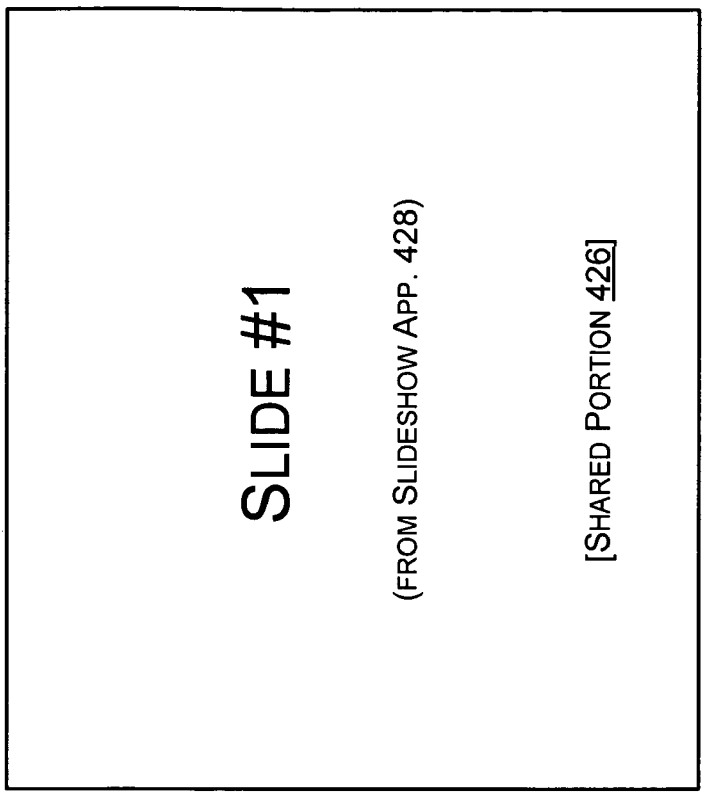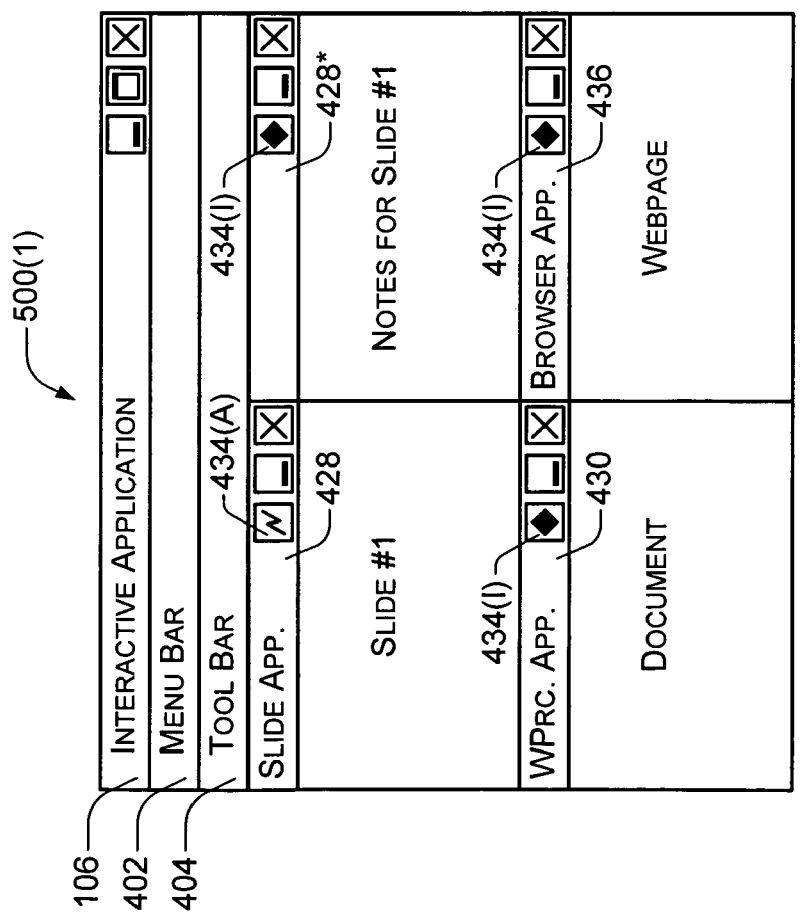
FIG. 5A

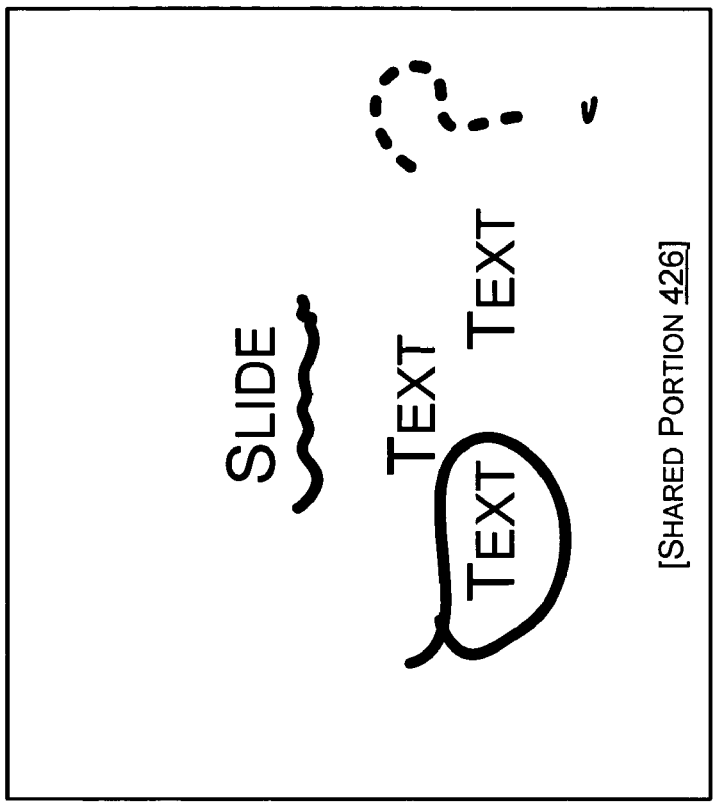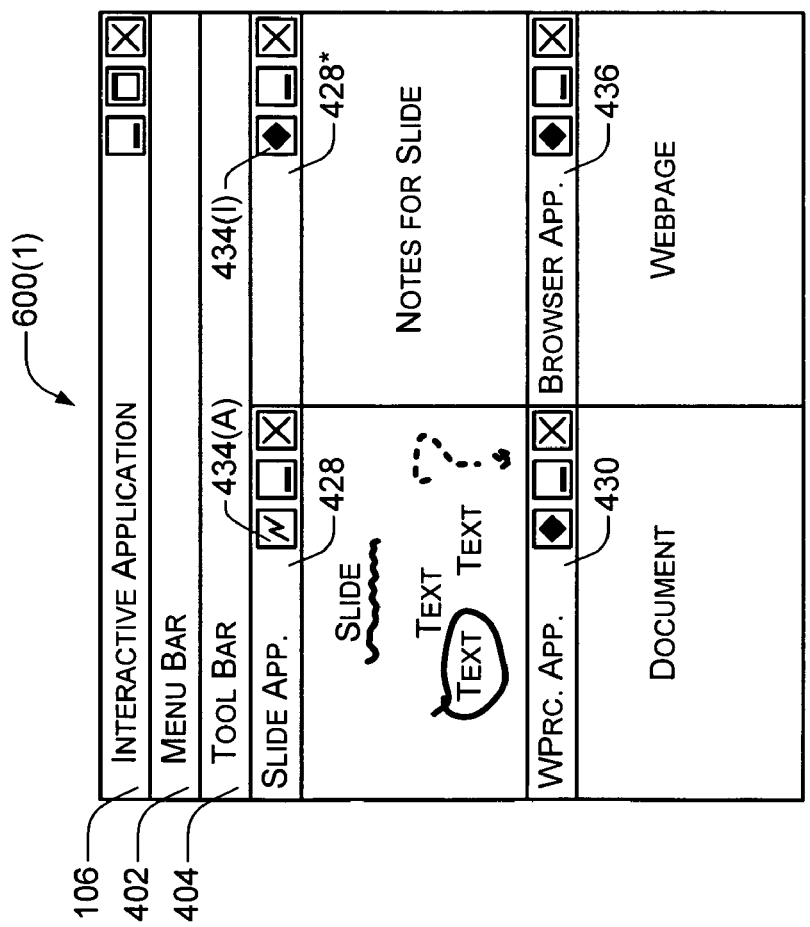
FIG. 6A

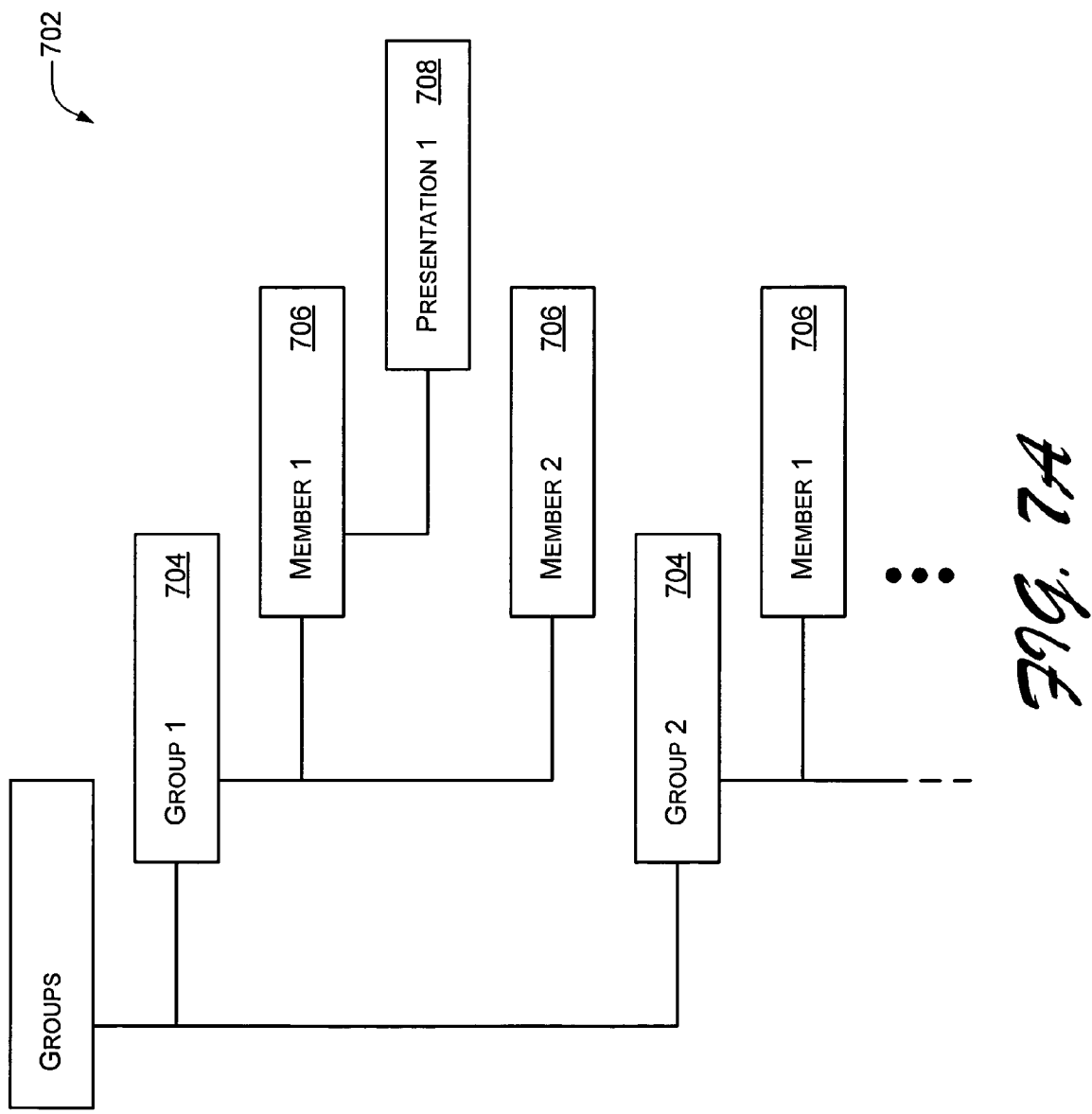

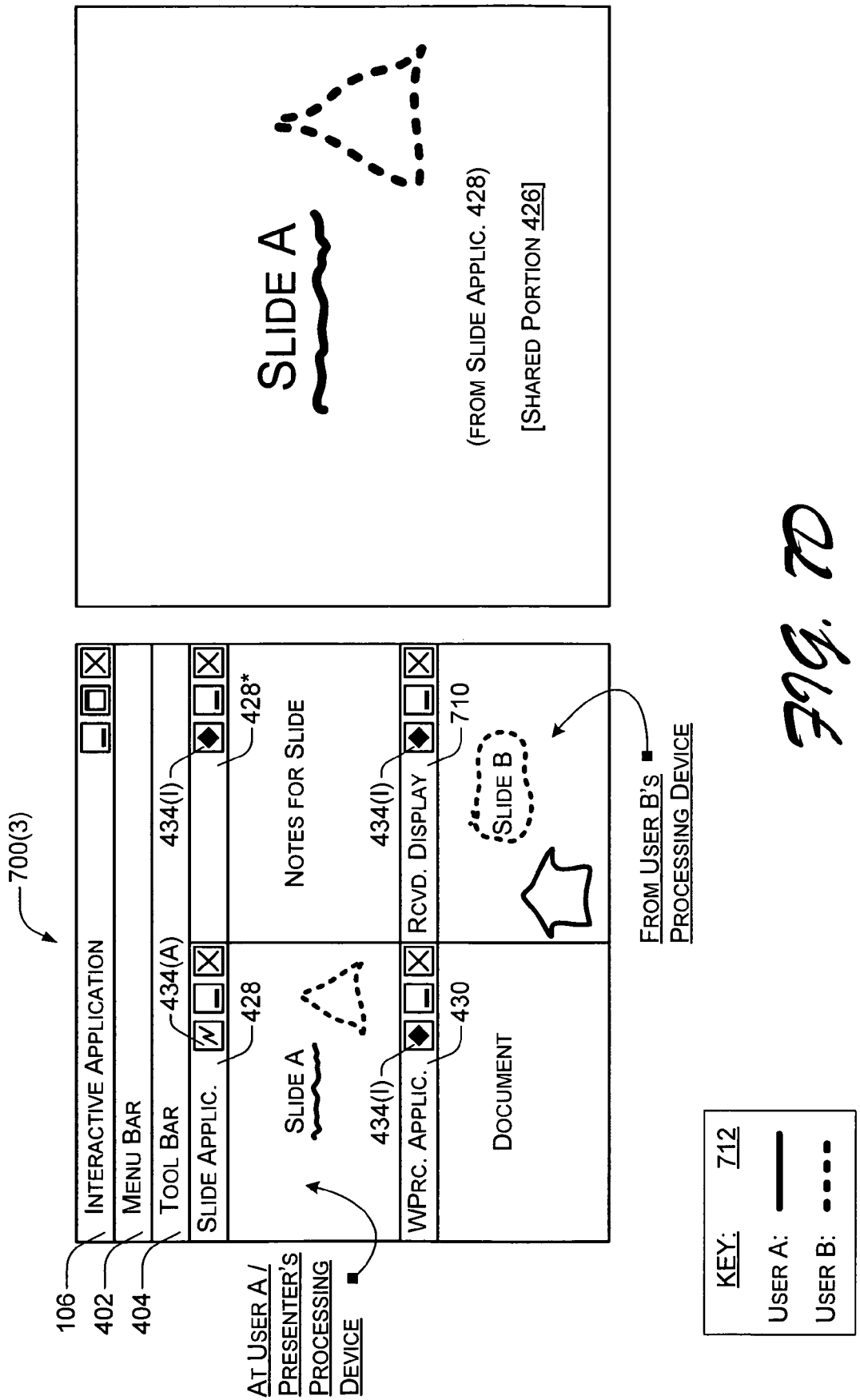

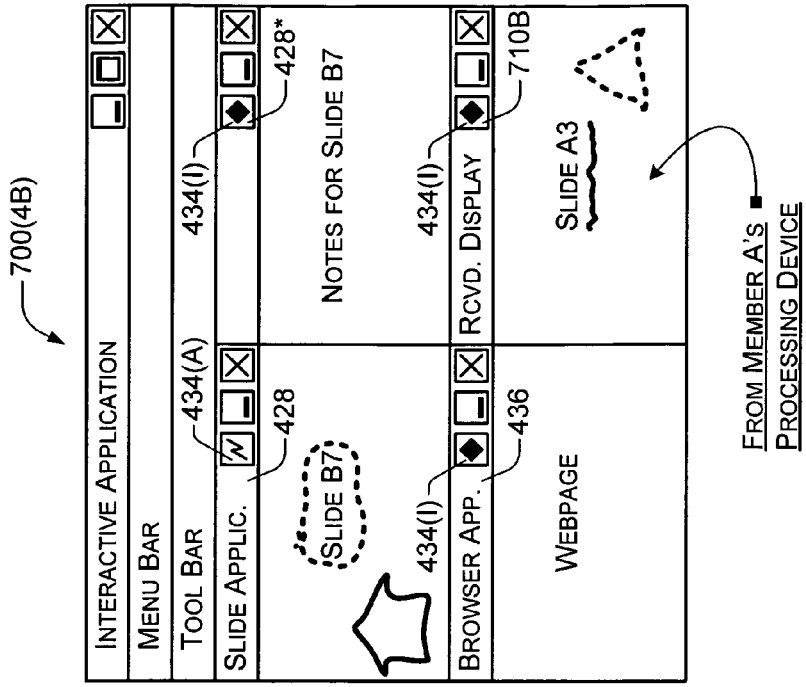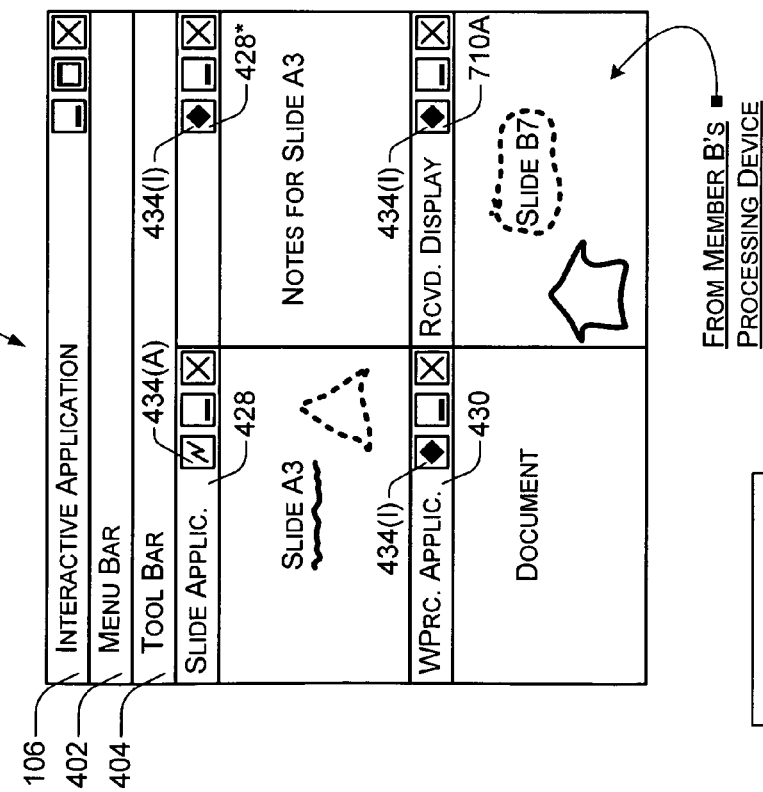

PRESENTATION FACILITATION

TECHNICAL FIELD

This disclosure relates in general to facilitating presentations and in particular, by way of example but not limitation, to enabling a presenter to synchronously share with audience members a portion of displayed content while keeping other displayed content private.

BACKGROUND

Individuals have been giving presentations using slides and manual reflective projectors for decades. In recent years, presenters have started using computers and digital projectors. Slides are prepared electronically using a slide show program. An example of such a slideshow program is "PowerPoint™" from Microsoft® Corporation. The author of the slides can include words, drawings, and even animations at the time of creation of the slides. The slides are then stored in a specific slideshow format.

When it is time for a presenter to give a presentation, the slideshow program is used to open the file in the specific slideshow format. Each slide can then be forwarded from the computer running the slideshow program to a digital projector for display. During the presentation, while the presenter is lecturing to an audience on a given topic, the presenter references the contents of each slide. This computer-enabled approach to presentations does offer a few advantages over previous manual approaches, such as fancier slides and easier updating thereof. Unfortunately, it still results in a relatively unidirectional and unilateral, as well as static, presentation.

Accordingly, there is a need for schemes and/or techniques that can facilitate active, bidirectional, and/or bilateral presentations, including those that facilitate seamless presentations and/or greater presenter-audience interaction.

SUMMARY

Multiple schemes and techniques for facilitating presentations with an interactive application are described. For example, an interactive application provides a console view overlay for integrating multiple productivity applications into a graphical user interface (GUI) window. An interactive application can also share a selected display portion of the console view overlay with other interactive applications. As another example, presenters and other audience members can draw on the selected display portion being shared, and the drawn graphics are synchronously displayed by the other interactive applications. Interactive applications, as directed by their users, can join various member groups and specific presentations thereof. Moreover, a user may share content in accordance with membership grouping.

Other method, system, approach, apparatus, device, media, procedure, arrangement, etc. implementations are described herein.

BRIEF DESCRIPTION OF THE DRAWINGS

The same numbers are used throughout the drawings to reference like and/or corresponding aspects, features, and components.

FIG. 4B illustrates examples for menu bar and tool bar aspects of a graphical user interface (GUI) for an interactive application.

FIG. 4C illustrates a general example of a screenshot, including a shared portion, for an integration feature of an interactive application.

FIGS. 4D-4F illustrate specific examples of screenshots with shared portions for an integration feature of an interactive application.

FIGS. 5A-5B illustrate examples of screenshots for a note synchronization feature of an interactive application.

FIGS. 6A-6C illustrate examples of screenshots for an ink animation feature of an interactive application.

FIG. 7A illustrates an example of a group membership organizational tree for a distributed communication feature of an interactive application.

FIGS. 7B-7D illustrate examples of screenshots for a distributed communication feature of an interactive application.

FIG. 7E illustrates example display screens of an interactive application for members A and B who are sharing content.

DETAILED DESCRIPTION

Introduction

Figure 1:
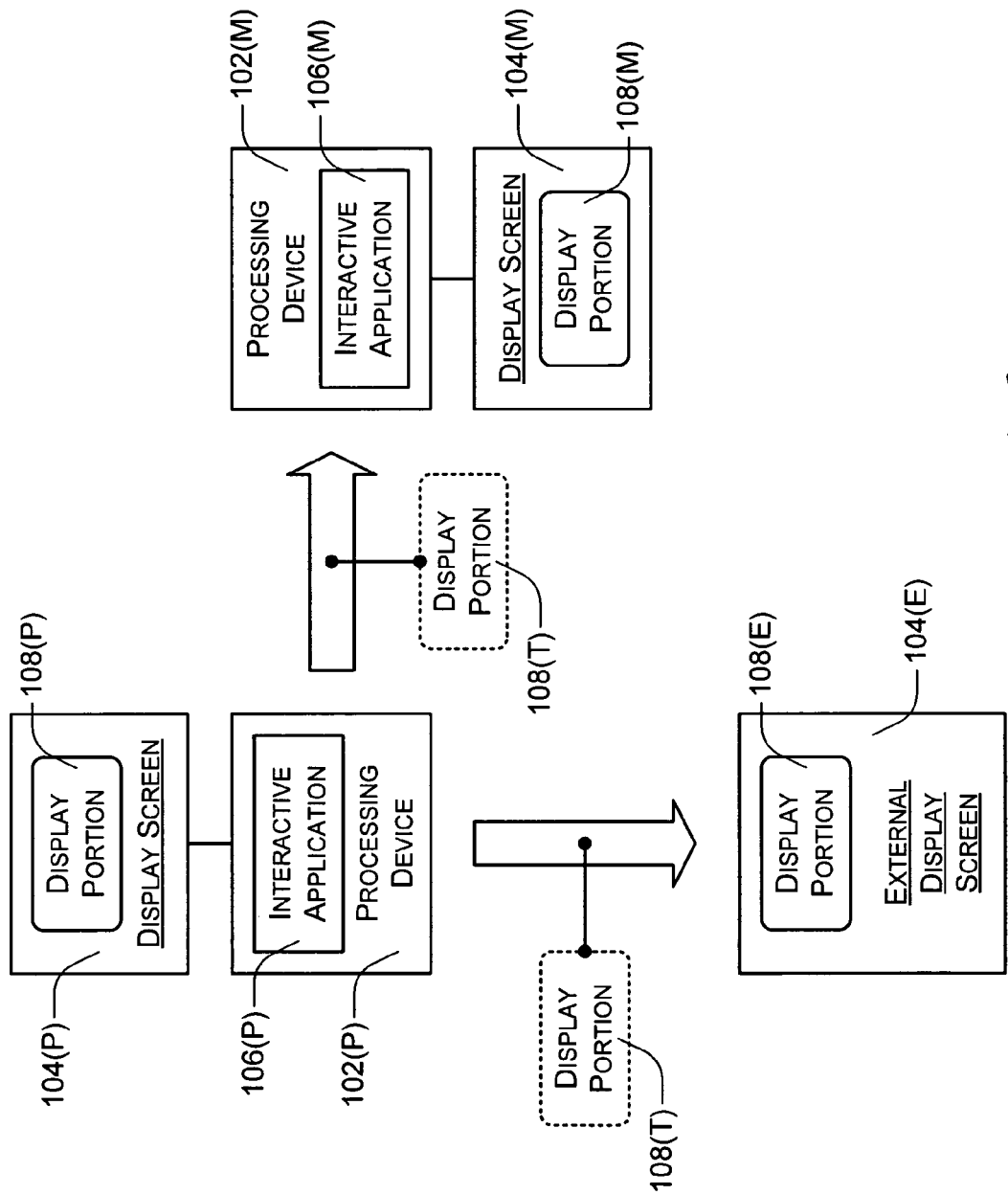
FIG. 1 illustrates an example of a sharing of a display portion of a display screen during a presentation using an interactive application running on a processing device.

In described implementations, a console is produced on a display screen of a processing device. The console facilitates the giving of presentations. For example, the standard one-person unilateral presentation model is extended to a multi-user interactive presentation model. The members involved in a presentation can interact with the presenter and supporting material, including slides, at some increased level, regardless of the status or type of a pre-fixed file. Additionally, spontaneity and/or a smooth presentation are facilitated.

A described interactive application can be used in a range of scenarios including conference speeches, department meetings, casual discussions, and so forth. In a conference speech, for example, a presenter can discuss material from a computer which is connected to a projector and a number of computers (e.g., writing-enabled laptop computers such as a "Tablet PC") that are held by audience members. First, the presenter shares a slideshow presentation with the audience while referring to synchronized notes that are appearing in another window on the desktop of the presenter's computer. Second, the presenter selects a webpage and shares it with the audience. The contents of files of other file types can also be presented directly without necessarily converting them to a slideshow-specific format.

Thus, the interactive application is capable of integrating multiple productivity applications onto and/or into the console. The console, or area of the desktop that is being utilized by the interactive application, can be divided into multiple portions for display of different files. A user can select which portion (or portions in alternative implementations) is to be shared for a current ongoing presentation and can modify another file's content or open another document through the console at the same time without interrupting the presentation which prevents the audience from becoming aware of this unseen background action. This integration aspect is described further below, particularly in the section entitled "Integration Feature Examples of an Interactive Application".

For slideshow presentations, a relatively miniaturized view of the slides is displayed in a portion of the console. These slides are synchronized with the slides that are also being presented to the audience members. Along with the view of the displayed slides, notes that are associated with the slides are displayed in another portion of the console. The notes may be displayed in relatively large text for easy readability. The display of the notes is synchronized to the associated slides such that changing a viewed slide changes the displayed note. This synchronized notation aspect is described further below, particularly in the section entitled "Notes Synchronization Feature Examples of an Interactive Application".

The interactive application also enables manual drawing (e.g., hand writing, notations, etc.) to be performed on shared content by the presenter or an audience member with the manual drawing being replicated on the shared display portion. In other words, ink animation is communicated across interconnected consoles for shared content so that added comments or notes are made apparent as if everyone is viewing and working on a single whiteboard. Thus, manual drawings are relatively simultaneously displayed on each member's console. This ink animation aspect is described further below, particularly in the section entitled "Ink Animation Feature Examples of an Interactive Application".

In this distributed system for audience members, the terminating devices thereof can be a personal computer, a projector, a mobile device, some combination thereof, and so forth. Users can participate in different interest groups, and each member may share his or her presentation with other group members. The synchronized content of the presentation, including spontaneous manual drawings, are shared across the multiple terminating devices of the group members. This simultaneous distributed communication aspect is described further below, particularly in the section entitled "Peer-to-Peer (P2P) Real-Time Communication (RTC) Feature Examples of an Interactive Application".

GENERAL INTERACTIVE APPLICATION ATTRIBUTE EXAMPLES

FIG. 1 illustrates an example of a sharing of a display portion 108 of a display screen 104 during a presentation using an interactive application 106 running on at least one processing device 102. Processing device 102(P) is being operated by a presenter, and processing device 102(M) is being operated by a member (e.g., a group and/or audience member). Although only one member processing device 102 (M) is illustrated, multiple such member processing devices 102(M) may alternatively participate in a shared distributed presentation.

As illustrated, display screen 104(P) is coupled to processing device 102(P), and display screen 104(M) is coupled to processing device 102(M). Although not required, display screens 104(P) and 104(M) are described as relatively personal display screens, such as a screen of a laptop computer, a screen of a tablet personal computer (PC), and so forth. Processing device 102(P) is also coupled to an external display screen 104(E). Although also not required, external display screen 104(E) is described as a relatively public or shared display screen, such as a projector/projection screen, a large monitor, and so forth. Processing devices 102 may be coupled to display screens 104 by any appropriate interface, including wired or wireless mechanisms.

In a described implementation, interactive application 106 (P) is running (e.g., functioning, executing, etc.) on processing device 102(P), and interactive application 106(M) is running on processing device 102(M). As introduced above, interactive applications 106 are capable of providing a number of presentation facilitating features, including application integration, notes synchronization, ink animation, and P2P RTC for distributed sharing of interactive presentation features.

Interactive application 106(P) enables a display portion 108(P) to be displayed on display screen 104(P). By way of example only, display portion 108 may be one portion of multiple portions of a console graphical user interface (GUI). Interactive application 106(P) also causes display portion 108(P) to be transmitted to processing device 102(M) and external display screen 104(E) as transit display portions 108(T). These respective transit display portions 108(T) may be in different formats in dependence upon the respective communication channels on which they are propagating and/or the respective destinations for which they are intended.

After arrival at their respective destinations, display portion 108(E) is displayed on external display screen 104(E), and display portion 108(M) is displayed on display screen 104(M). Display portion 108(M) may be displayed on display screen 104(M) by interactive application 106(M) in a console GUI format. Updates, changes, ink animations applied, etc. to display portion 108 at processing device 102(P) or processing device 102(M) are synchronized across the various display screens 104 by interactive applications 106. These synchronizations, as well as other features, are described further herein below.

Figure 2:
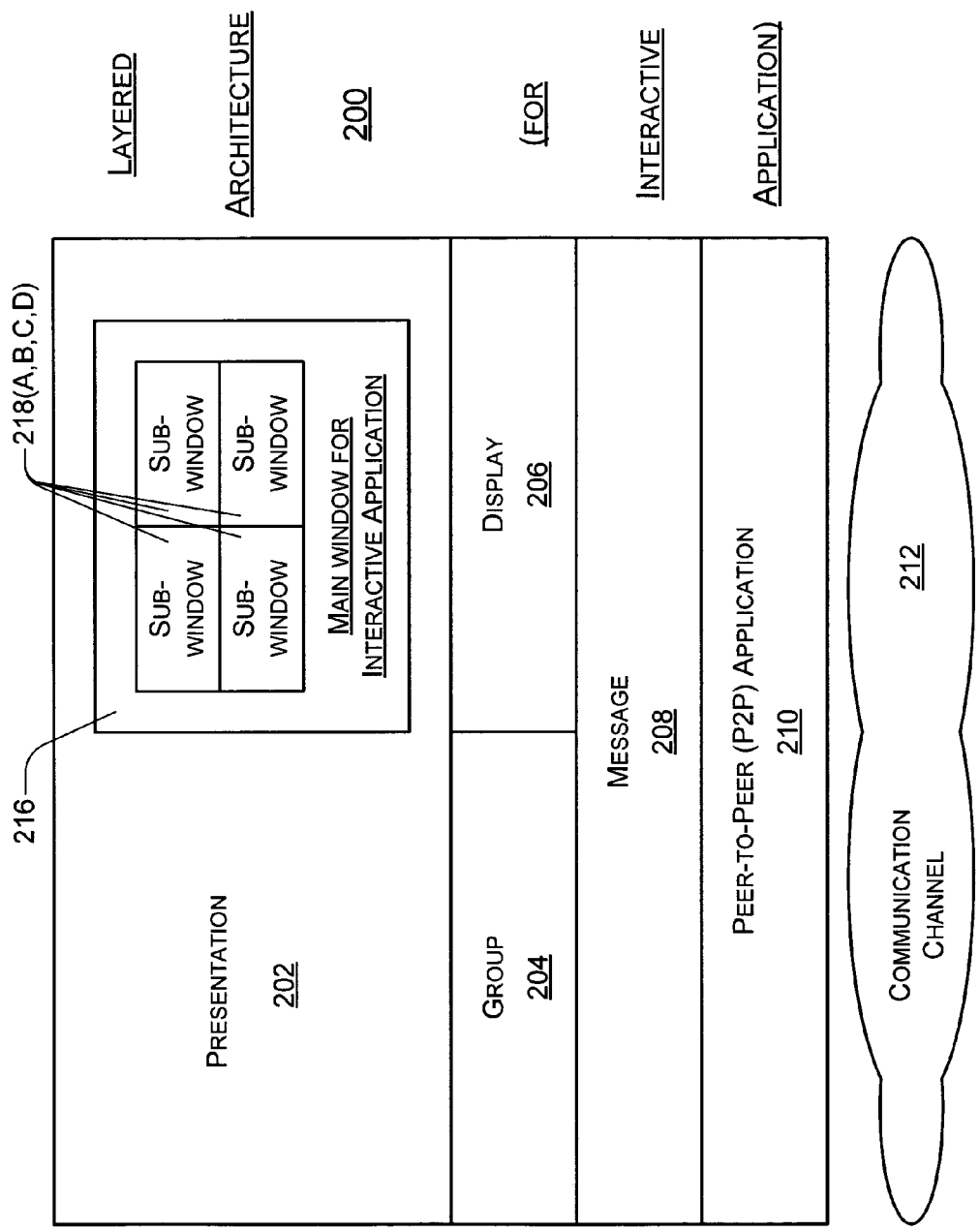
FIG. 2 illustrates an example of a layered architecture for an interactive application running on a processing device.

FIG. 2 illustrates an example of a layered architecture 200 for an interactive application 106 running on a processing device 102. Layered architecture 200 includes a presentation layer 202, a group/display layer 204/206, a message layer 208, a peer-to-peer (P2P) application 210, and a communication channel (layer) 212.

At presentation layer 202, a main window or console area 216 for the interactive application is divided into different portions (e.g., four portions in a described implementation). Each portion is for one sub-window 218 of four sub-windows 218(A, B, C, D). Each sub-window 218 can be used to operate a productivity application for opening/manipulating a file, which can be shared with other members, or can be used to display other members' shared content.

Automation technology ensures file type compatibility with the interactive application. Because a presenter is actually operating through the relevant productivity application, the presenter can edit files during a presentation instead of being limited to static, pre-prepared content. The presenter can switch between/among different sub-windows 218 to select which sub-window 218 is to be shared with others.

At group/display layer 204/206, a group management component 204 is responsible for managing interaction between/among group members. Such management actions may include: member joins, member quits, shared content broadcasts, and support for distributed ink animations. As described further herein below, any processing device having an interactive application 106 can organize into one or more groups via various communication channels 212. Examples of such communication channels 212 include the Internet, a local area network (LAN) cable, a wireless connection, some combination thereof, and so forth.

Group management component 204 contains information regarding each member of each group. It can transfer a group member's action and status to other group members and provide group membership data to display management component 206 for coordinating the transmission of display broadcast information. This transferred information is passed to or retrieved from message processing layer 208 for packing, unpacking, and network transmission at lower layer(s).

The duty of display management component 206 is twofold: firstly, it synchronizes local shared presentations with corresponding member termination devices; secondly, it receives synchronization data from other termination devices and updates the corresponding local display sub-window 218.

If a particular sub-window 218 is selected as the shared window, display component 206 (i) monitors changes to the display of that particular sub-window 218, (ii) captures the image of the displayed portion, (iii) retrieves group member information from group component 204, and (iv) passes relevant broadcast display data and parameters to the lower message layer 208. When the broadcast display data arrives at another member's processing device, the message component 208 thereat forwards the unpacked display information to the display component 206 thereat. That display component 206 then displays the information (e.g., the changes, the additions, etc.) at the content for the corresponding display portion or sub-window 218.

At message layer 208, message component 208 performs the following functions: packing data from the upper layers and unpacking data from the lower layers. The packed data is transmitted between and among interactive applications using defined message types. The network layer, or communication channel, richly makes use of various network connection methods including Internet, LAN, wireless networking, and so forth.

The P2P application layer 210 is responsible for control of the location resource of each group member device in a group. P2P application 210 maintains network connections between member devices. It also handles message sending and receiving between two points. When group component 204 decides to send a message to a member, P2P application 210 determines the network address of the destination and uses the network connection of communication channel 212 to send it. The mapping method is analogous during the receiving process.

Additional description of the functionalities of group component 204, display component 206, and P2P application 210 is provided herein below, especially in the section entitled "Peer-to-Peer (P2P) Real-Time Communication (RTC) Feature Examples of an Interactive Application".

Figure 3:
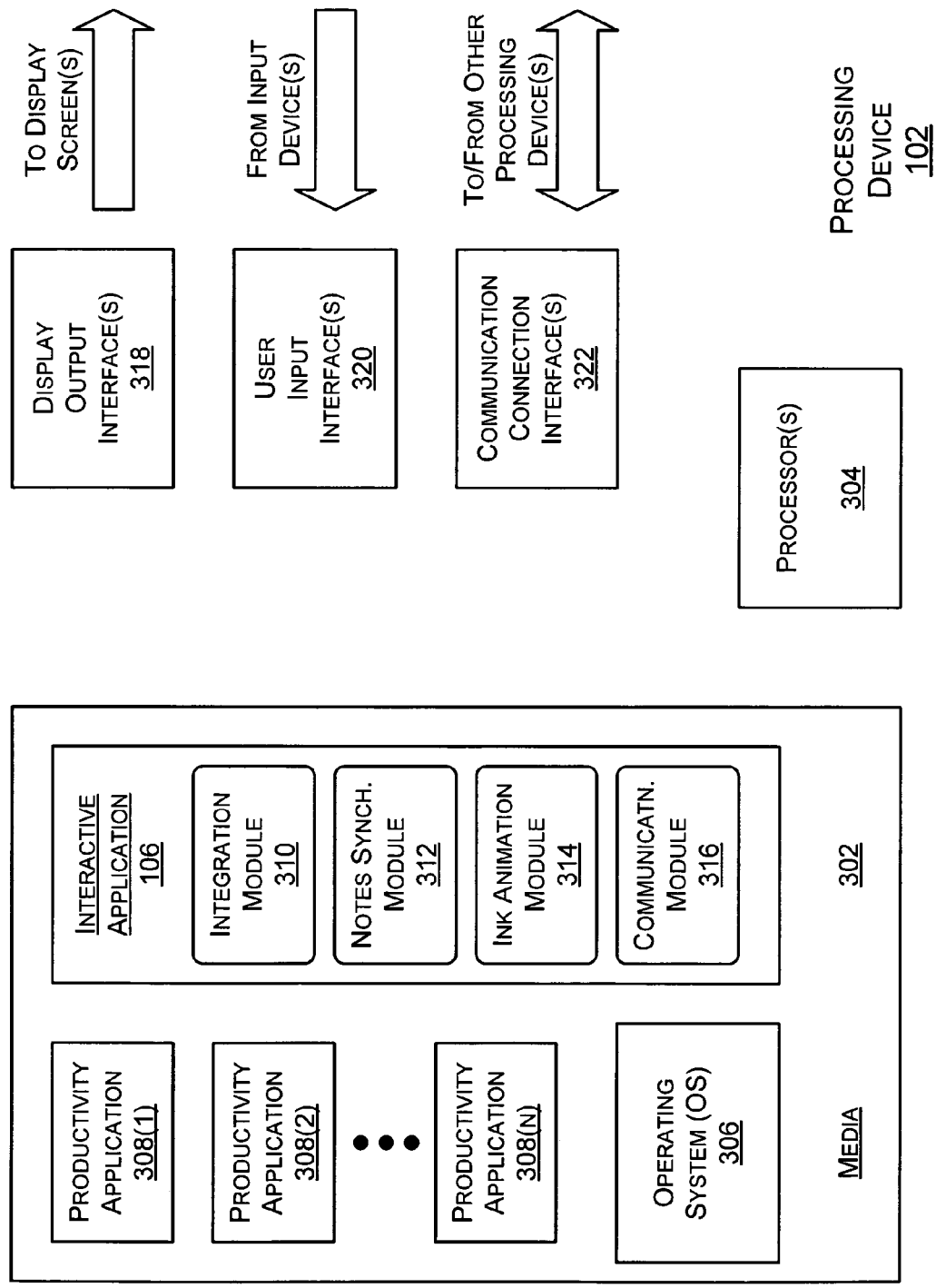
FIG. 3 is an example of a logical diagram of a processing device running an interactive application.

FIG. 3 is an example of a logical diagram of a processing device 102 running an interactive application 106. As illustrated, processing device 102 includes media 302, one or more processors 304, and a variety of interfaces 318, 320, and 322. Although only certain components are illustrated in FIG. 3 and described with reference thereto, other components may be, and likely are, present in a processing device 102.

In a described implementation, processor 304 is capable of executing, performing, and/or otherwise effectuating processor-executable instructions. Media 302 is comprised of one or more processor-accessible media, such as a volatile or non-volatile memory, a wireless or wired propagation channel, some combination thereof, and so forth. Media 302 includes processor-executable instructions that are executable by processor 304 to effectuate the performance of functions by processing device 102.

Specifically, media 302 includes an operating system (OS) 306, at least one productivity application 308(1), 308(2) . . . 308(n), and interactive application 106. Additional description and examples of media 302 are provided in the subsection below entitled "Additional Environmental, Component, and Operational Examples for a Processing Device".

OS 306 establishes a foundation for the operation of other applications on processing device 102 by, for example, providing a user interface framework, handling input/output functions, managing memory requirements, orchestrating resource division, and so forth. Productivity applications 308 enable the performance of business, entertainment, educational, etc. tasks. Examples of productivity applications 308 include word processing applications, slide presentation applications, email and/or schedule management applications, web browsing applications, art/drawing applications, music/movie creation applications, some combination thereof, and so forth.

Interactive application 106 includes an integration module 310, a notes synchronization module 312, an ink animation module 314, and a communication module 316. Each module, possibly in conjunction with another module, performs at least one function of interactive application 106. Hence, although illustrated separately, two or more modules may operate together when performing any given function. For example, integration-related functions may be effectuated using integration module 310 and communication module 316.

Each module is described further herein below. Specifically, integration module 310 is described further below, particularly in the section entitled "Integration Feature Examples of an Interactive Application". Notes synchronization module 312 is described further below, particularly in the section entitled "Notes Synchronization Feature Examples of an Interactive Application". Ink animation module 314 is described further below, particularly in the section entitled "Ink Animation Feature Examples of an Interactive Application". Communication module 316 is described further below, particularly in the section entitled "Peer-to-Peer (P2P) Real-Time Communication (RTC) Feature Examples of an Interactive Application".

Interfaces 318, 320, and 322 include one or more display output interfaces 318, one or more user input interfaces 320, and one or more communication connection interfaces 322. In a described implementation, display output interfaces 318 include those video interfaces for interfacing with personal and external display screens 104(P) and 104(E) (of FIG. 1), respectively. User input interfaces 320 include those man-machine interfaces enabling a human to provide input to processing device 102. Examples of input devices include a keyboard, a tablet, a touch-sensitive screen, a mouse, a stylus, an electronic pin, a gyroscopic-based input device, some combination thereof, and so forth. Output interfaces for output devices besides displays (e.g., speakers, printers, etc.) may additionally be included as part of processing device 102. Display output interfaces 318 and user input interfaces 320 may be configured for wired or wireless communication.

Communication connection interfaces 322 may also be configured for wired or wireless communication. Communications effectuated via a communication connection interface 322 are propagated over a communications channel (e.g., communications channel 212 of the network layer of FIG. 2) to or from another processing device 102, for example. Such communications can include broadcast display data being sent from one display management component 206 at one processing device 102 to another display management component 206 at another processing device 102. Additional description and examples of communication channels and corresponding communication connection interfaces 322 are provided in the following sub-section entitled "Additional Environmental, Component, and Operational Examples for a Processing Device".

Additional Environmental Component and
Operational Examples for a Processing Device Generally, processing device 102 may comprise any (e.g., electronic) device with computing/processing capabilities. As partially described above with reference to FIG. 3, the components of processing device 102 may include, but are not limited to, processor(s) 304, media 302, and one or more interconnecting buses that couple various system components including processor 304 to media 302 and/or interfaces 318, 320, and 322.

Presentation facilitation may be realized with numerous general purpose or special purpose devices, systems, environments, and/or configurations. Examples of well known devices, systems, environments, and/or configurations that may be suitable for use include, but are not limited to, personal computers (PCs), server computers, thin clients, thick clients, personal digital assistants (PDAs) or mobile telephones, watches, hand-held or tablet devices, laptop devices, multiprocessor systems, microprocessor-based systems, set-top boxes, programmable consumer electronics, video game machines, game consoles, portable or handheld gaming units, video conferencing equipment, network PCs, minicomputers, mainframe computers, wired or wireless networks, distributed or multi-processing computing environments that include any of the above systems or devices, some combination thereof, and so forth.

Processors 304 are not limited by the materials from which they are formed or the processing mechanisms employed therein. For example, processor 304 may be comprised of semiconductor(s) and/or transistors (e.g., electronic integrated circuits (ICs)). In such a context, processor-executable instructions may be electronically-executable instructions. Alternatively, the mechanisms of or for processors 304, and thus of or for processing device 102, may include, but are not limited to, quantum computing, optical computing, mechanical computing (e.g., using nanotechnology), and so forth.

Processing device 102 typically includes a variety of processor-accessible media 302. Such media may be any available media that is accessible by processing device 102 or another device, and it includes both volatile and non-volatile media, removable and non-removable media, and storage and transmission media.

Examples of storage media 302 include, but are not limited to, hard disks, removable magnetic disks, removable optical disks (e.g., compact disks (CDs), digital versatile disks (DVDs), etc.), flash memory, random access memory (RAM), read only memory (ROM), some combination thereof, and so forth. Other examples include magnetic cassettes or other magnetic storage devices, electrically-erasable programmable read-only memories (EEPROM), and so forth. Such storage media 302 may also include so-called special purpose or hard-wired IC chips. In other words, any processor-accessible storage media may be utilized to realize the storage media 302 of processing device 102.

Additionally, media 302 may comprise transmission media 302. Transmission media 302 includes communications connection interface(s) 322, as well as wired or wireless communication channels 212 that allow processing device 102 to communicate with other devices. Transmission media typically comprises processor-accessible instructions (e.g., coding, data structures, program modules, messages, or other data) in a modulated data signal such as a carrier wave or other transport mechanism; it can also include any information delivery media. The term "modulated data signal" embraces signals that have one or more of their characteristics set or changed in such a manner as to encode information in the signal. By way of example but not limitation, transmission media includes wired media such as a wired network or a direct-wired connection and wireless media such as acoustic, radio frequency (RF), infrared, and other wireless media.

Thus, realizations for presentation facilitation may be described in the general context of processor-executable instructions. Generally, processor-executable instructions include routines, programs, coding, modules, protocols, objects, interfaces, components, metadata and definitions thereof, data structures, etc. that perform and/or enable particular tasks and/or implement particular abstract data types. Implementations of presentation facilitation, as described in certain embodiments herein, may also be practiced in distributed processing environments where tasks are performed by remotely-linked processing devices that are connected through a communications channel and/or network. Especially but not exclusively in a distributed computing environment, processor-executable instructions may be located in separate storage media, executed by different processors, and/or propagated over/extant on transmission media.

Logical connections between different processing devices 102 may be realized, for example, as a local area network (LAN) or a general wide area network (WAN). Such networking environments are commonplace in offices, enterprise-wide computer networks, intranets, the Internet, fixed and mobile telephone networks, ad-hoc and infrastructure wireless networks, other wireless networks, gaming networks, some combination thereof, and so forth. Such networks and communications channels thereof are additional examples of transmission media.

Especially in a networked environment, program modules or other processor-executable instructions that are depicted relative to one processing device 102, or portion thereof, may be fully or partially stored in a remote media storage device. By way of example, communication module 316 of interactive application 106 may reside on a memory component of one processing device 102 but may be usable or otherwise accessible via a different processing device 102. Also, although interactive application 106, as well as other processor-executable instructions such as OS 306, are illustrated herein as discrete blocks, it is recognized that such programs, modules, components, and other instructions or portions thereof reside at various times in different storage components (e.g., RAM and a hard disk) of processing device 102 and are executed by processor 304 of processing device 102.

Integration Feature Examples of an Interactive
Application

In a described implementation, interactive application 106 facilitates presentations by, at least in part, enabling multiple productivity applications 308 to be integrated together into one console view. Integration module 310 performs the initial and primary integration, but communication module 316 and ink animation module 314 contribute to the presentation facilitation, especially from a distributed, audience-member-participation perspective, as is described further below in subsequent sections.

Figure 4A:
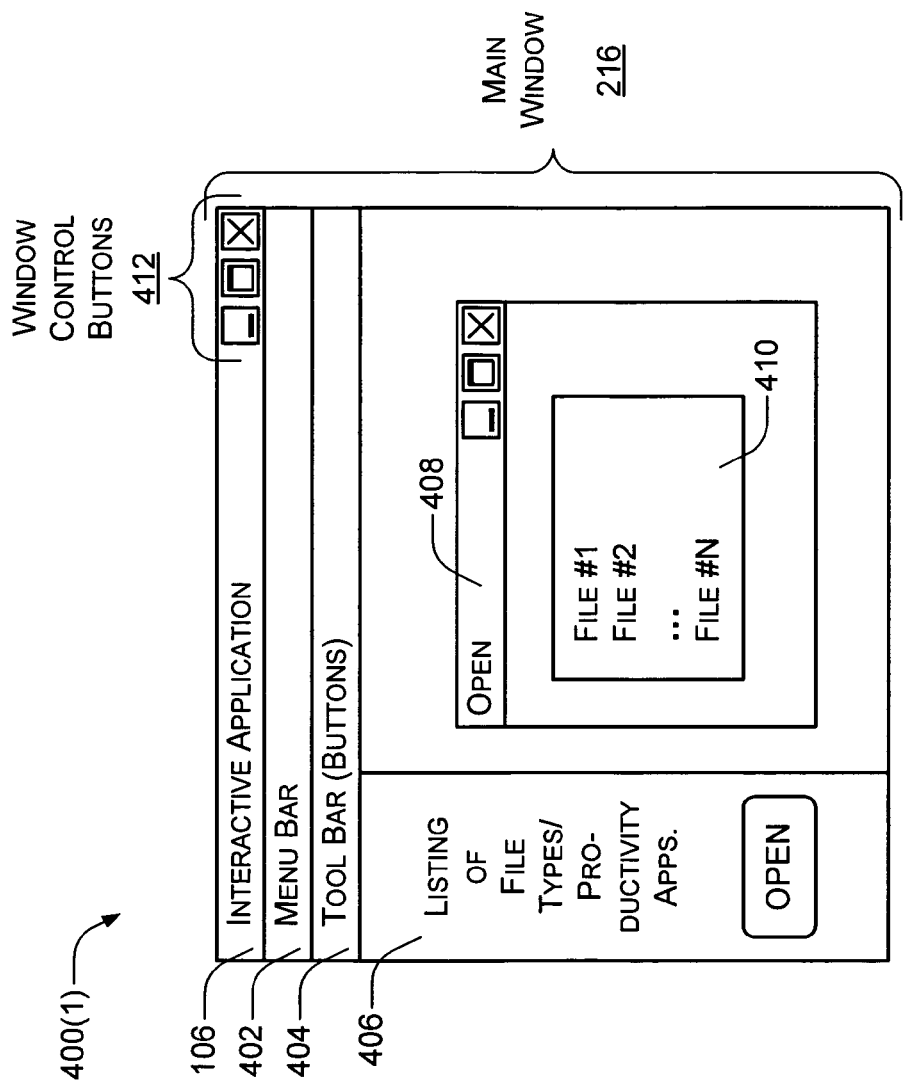
FIG. 4A is an example of an initial screenshot of an interactive application.

FIG. 4A is an example of an initial screenshot 400(1) of an interactive application 106. Interactive application 106, as represented by its main window 216, is illustrated in a start-up or other mode in which a new file is being accessed. Main window 216 includes standard (e.g., those that are determined by OS 306) window control buttons 412. As illustrated, window control buttons 412 include, from left to right, a minimization button, a maximization button, and a closing or termination button.

Interactive application 106 includes a menu bar 402 and a tool bar 404, which includes user-selectable buttons. An example of a menu bar 402 and a tool bar 404 (including buttons thereof) for an interactive application 106 is described further below with reference to FIG. 4B.

In the illustrated initialization or other file-accessing mode, main window 216 of interactive application 106 includes a first region 406 (e.g., a pane of a window) devoted to a listing of eligible file types and/or available productivity applications 308, along with an "OPEN" activation button. Once a file type and/or productivity application 308 has been selected, an open-file dialog window 408 appears with a listing 410 of file names that have the selected file type and/or that are appropriate for the selected productivity application 308.

Selection of a named file of listing 410 causes interactive application 106 to launch or cause to be launched the (selected) productivity application 308 that is appropriate for the selected file. The selected file is also opened in a sub-window 218. An example of such a sub-window 218 is described further below with reference to FIG. 4C.

FIG. 4B illustrates examples for menu bar 402 and tool bar 404 aspects of a graphical user interface (GUI) for an interactive application 106. A top portion of a main window 216 for interactive application 106 is illustrated. Menu bar 402 includes three menu items: a "File" menu item, a "Tool" menu item, and a "Projector" menu item. A different set of menu items may alternatively be implemented.

The "File" menu item enables file-related functions to be accessed. These functions may include opening files, closing files, and so forth. Furthermore, other standard file menu options, such as printing or converting, may be included. The "Tool" menu item enables access to various tools offered by interactive application 106, possibly including the tools present on tool bar 404. A "Projector" menu item enables access through interactive application 106 to adjustable features and/or general control of a projection function and/or of a projector that is coupled to processing device 102.

Tool bar 404, as illustrated, includes buttons for tools that are likely to be routinely used during a presentation. These control buttons include slide buttons 414, color palette buttons 416, pointer selection buttons 418, line style selection buttons 420, voice note recorder tool button 422, and file management button 424, which provides quick access to common file functions (e.g., open file). More or fewer buttons for each of the illustrated button tool sets and/or other button tool sets may alternatively be implemented.

Slide buttons 414 enable a presenter to switch between slides or to terminate a slideshow presentation. For example from left to right, slides may be changed to a next slide or a previous slide, and the presentation may be ended. Color palette buttons 416 enable selection of colors for highlighting text and/or figures with semi-transparent colors and for drawing and/or marking on the slide for emphasis.

Pointer selection buttons 418 enable the selection of a desired pointer shape, such as a hand or finger, an arrow, a character, a symbol, etc. Line style selection buttons 420 enables a presenter to choose between lines of differing thickness, broad and narrow highlighters, motion animating arrows, and so forth.

Voice note recorder tool button 422 allows a presenter to record follow-up action items, questions, etc. that are to be addressed later. It can also be used to recall specific names or contact information for audience members that are to be contacted later. The speech being recorded may be collected in a manner that is opaque to the audience members so that the fluidity of the presentation is not jeopardized. In other words, a presenter may press the recording button during the presentation and then press the cease recording button when the relevant speech information has been recorded and that voice note is therefore complete.

FIG. 4C illustrates a general example of a screenshot 400(2), including a shared portion 426, for an integration feature of an interactive application 106. The console view provided by interactive application 106 divides main window 216 (as indicated in FIGS. 2 and 4A) into four sub-windows 218 (as also indicated at FIG. 2).

The pane for listing 406 (of FIG. 4A) may be left visible or slid closed. In FIG. 4C, pane 406 having the listing of eligible file types and/or available productivity applications 308 has been slid closed and rendered (at least temporarily) un-viewable. Although not so pictured, each sub-window 218 that is providing a portal for a productivity application 308 may include one or more menu and/or tool bars for that productivity application 308.

As illustrated, the four sub-windows 218 are occupied by three different productivity applications 308. These productivity applications 308 include: a slideshow application 428/428* (which is occupying two sub-windows 218), a word processing application 430, and an email application 432. Hence, interactive application 106 is integrating three different productivity applications 308 onto the viewing console. However, additional productivity application(s) 308 that have been previously minimized may be brought onto the working area of the console view of interactive application 106 (e.g., by replacing or covering a current one). Alternatively, more (or fewer) than 4 sub-windows 218 may be presented.

Email application 432 is displaying an inbox and/or an opened email. Word processing application 430 is displaying an opened document. Slideshow application 428 is displaying a slide of an opened slideshow presentation file. As is described further below with particular reference to FIGS. 5A-5E, slideshow application 428* is also displaying a note or notes associated with the displayed slide, but in a different sub-window 218. Because each particular file is opened through its corresponding native productivity application 308, each particular file may be amended or otherwise manipulated in manners provided by its corresponding native productivity application 308.

Any one (or possibly more) of the portions of main window 216 may be shared with audience members participating in a presentation. The shared portion 426 (or portions) is transmitted as shared display portions 108(T) (of FIG. 1) to other processing devices 102 and/or to an external display screen 104(E). Shared portions 426 are described further below with particular reference to FIGS. 4D-4F.

Figure 4D:
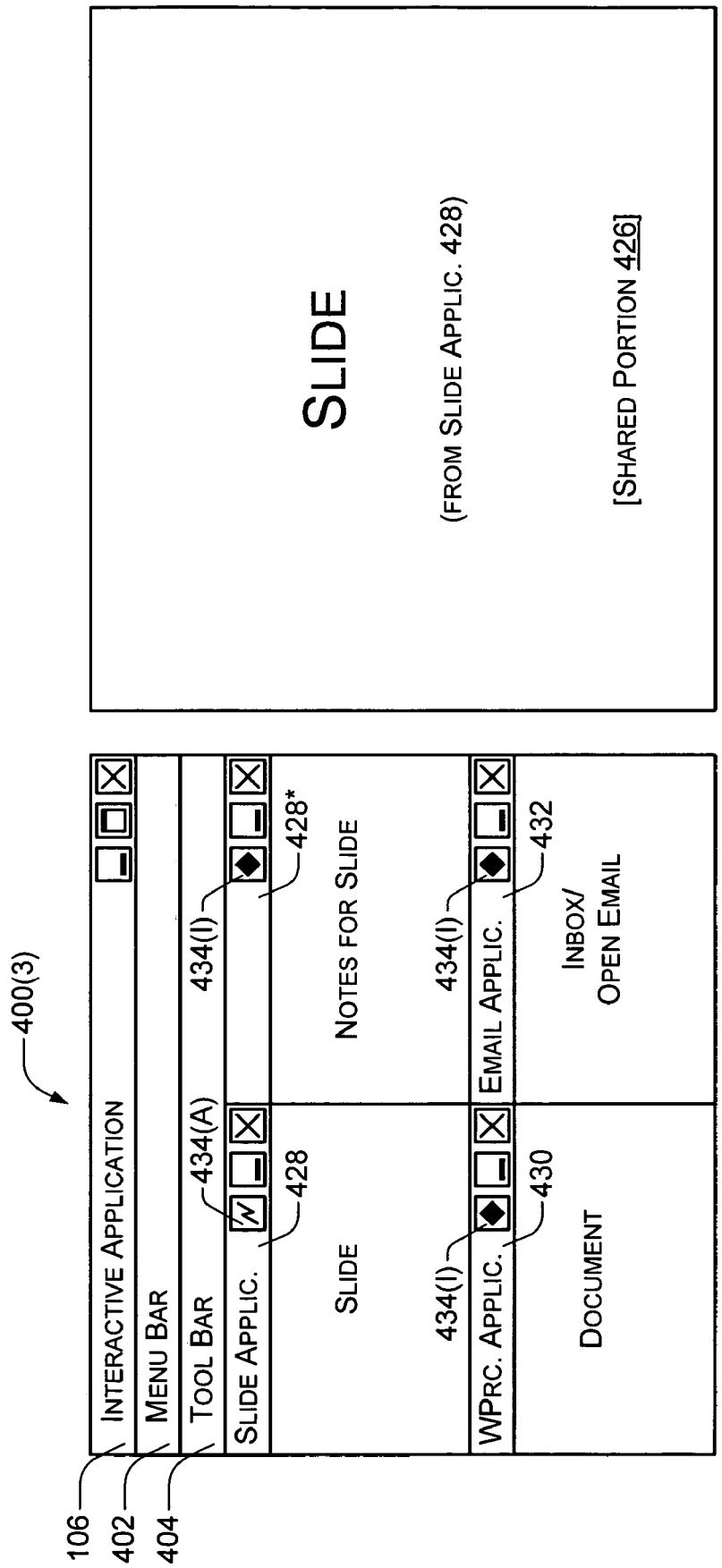

FIGS. 4D-4F illustrate specific examples of screenshots 400(3) to 400(5) with shared portions 426 for an integration feature of an interactive application 106. With interactive application 106, a user may select (the displayed content of) which productivity application 308 is to be shared with audience members. The sharing may be effectuated with other processing devices 102 and/or an external display screen 104(E).

Selection of a display portion for sharing may be accomplished using any one or more of a myriad of e.g. GUI input mechanisms. These include key combinations with a keyboard, typed commands, drop-down menus (e.g., from menu bar 402), pressing a button on a tool bar (e.g., tool bar 404), pressing a window control button 412 (of FIG. 4A), some combination thereof, and so forth.

As illustrated at screenshot 400(3) of FIG. 4D, a specialized window control button 434 is added by interactive application 106 to each sub-window 218 for each productivity application 308. Share selection window control button 434 can be in an active state 434(A) or an inactive state 434(I). The states can be toggled by selecting this project-out button with an input device that is directing a pointer icon.

If a sub-window 218 has an active share selection window control button 434(A), the contents displayed in that window are shared as shared portion 426 with other audience members. Thus, the slide of slideshow application 428 is shared as shared portion 426. If a sub-window 218 has an inactive share selection window control button 434(I), the contents displayed in that window are not shared with other audience members. Hence, the windowed contents displayed by word processing application 430 and email application 432 are not shared.

Optionally, the "notes for slide" sub-window 218 may not have a sharing capability. Interactive application 106 may be configured to enable the sharing of one sub-window 218 or multiple sub-windows 218. If only one sub-window 218 is sharable at any given moment, then the set of four (or three) share selection window control buttons 434 may act in a "radio style" in which activating one deactivates a previously-active button.

As illustrated at screenshot 400(4) of FIG. 4E, share selection window control buttons 434(I) are inactive for slideshow application 428 (both windows) and a browser application 436. On the other hand, share selection window control button 434(A) is active for word processing application 430. Hence, the document being displayed and possibly modified through word processing application 430 is being shared as shared portion 426.

As illustrated at screenshot 400(5) of FIG. 4F, share selection window control button 434(A) for browser application 436 has been activated by a user, and share selection window control buttons 434(I) are inactive for word processing application 430 and slideshow application 428. Hence, the webpage being displayed through browser application 436 is being shared as shared portion 426.

Notes Synchronization Feature Examples of an Interactive Application

Figure 5B:
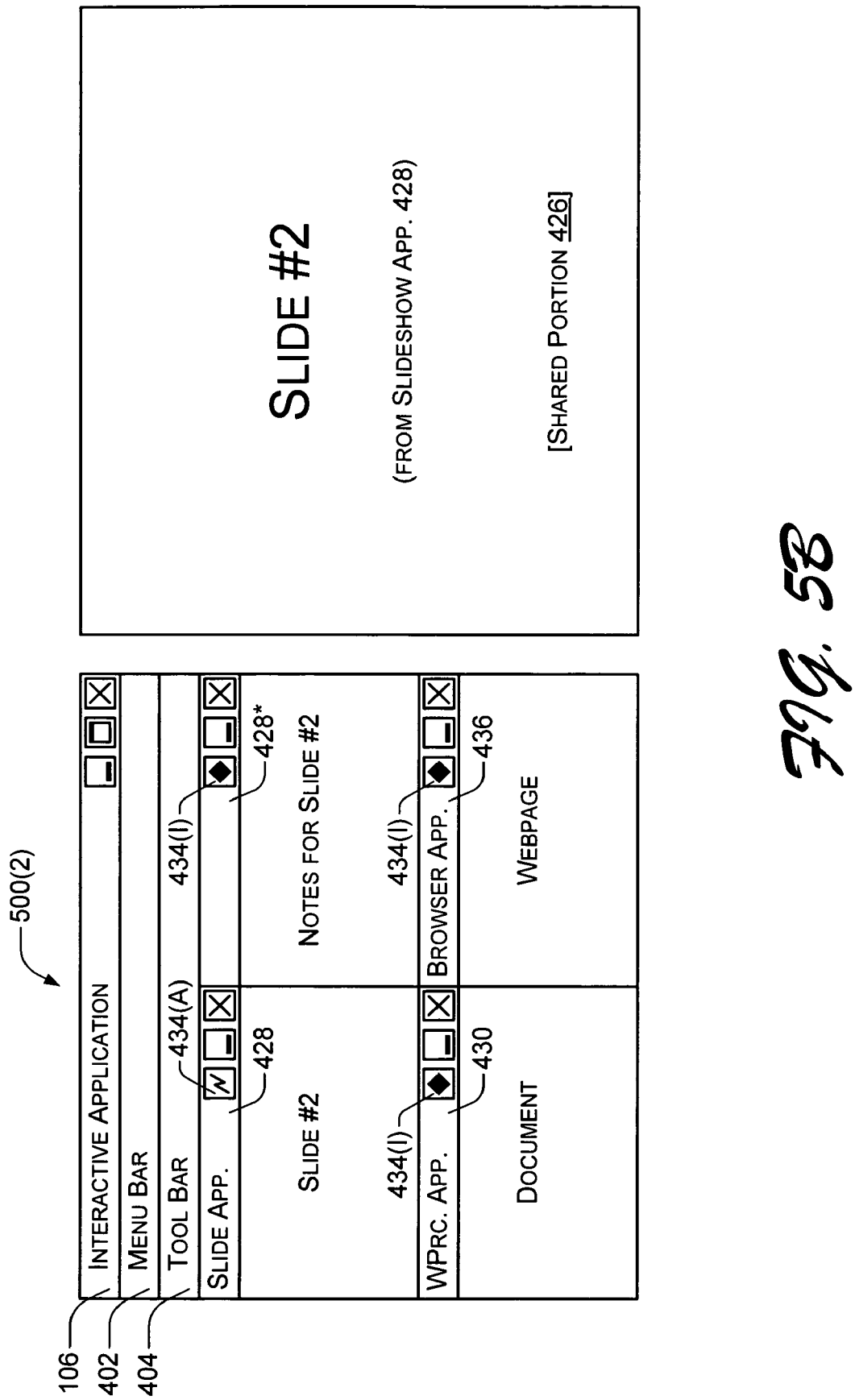

FIGS. 5A and 5B illustrate examples of screenshots 500(1) and 500(2) for a note synchronization feature of an interactive application 106. This feature may be implemented, at least in part, by notes synchronization module 312 (of FIG. 3). As illustrated at screenshot 500(1) of FIG. 5A, slideshow application 428 is selected as a project-out sub-window 218 as indicated by active share selection window control button 434(A). Consequently, the displayed slide #1 is shared as shared portion 426.

Alongside the sub-window 218 that is displaying slide #1 through slideshow application 428, another sub-window 218 is displaying notes for slide #1 as indicated at 428*. The notes for slide #1 may be referred to or even read from by a presenter during a presentation part that is referencing slide #1. When the presenter is finished with slide #1, the presenter advances the slideshow to the next slide, slide #2. This slide advancement may be accomplished, for example, by pressing a next slide button from among slide buttons 414 (of FIG. 4B).

As illustrated at screenshot 500(2) of FIG. 5B, slideshow application 428 continues to be selected as a project-out sub-window 218 as indicated by active share selection window control button 434(A). Consequently, the displayed slide #2 is shared as shared portion 426. Alongside the sub-window 218 that is displaying slide #2 through slideshow application 428, another sub-window 218 is displaying notes for slide #2 as indicated at 428*.

Notes synchronization module 312 of interactive application 106 maintains the displayed notes portion 428* so as to be synchronized to the slides that are currently being displayed by slideshow application 428. In other words, notes synchronization module 312 displays notes that are associated with each slide as each slide is changed during a presentation.

Figure 5C:
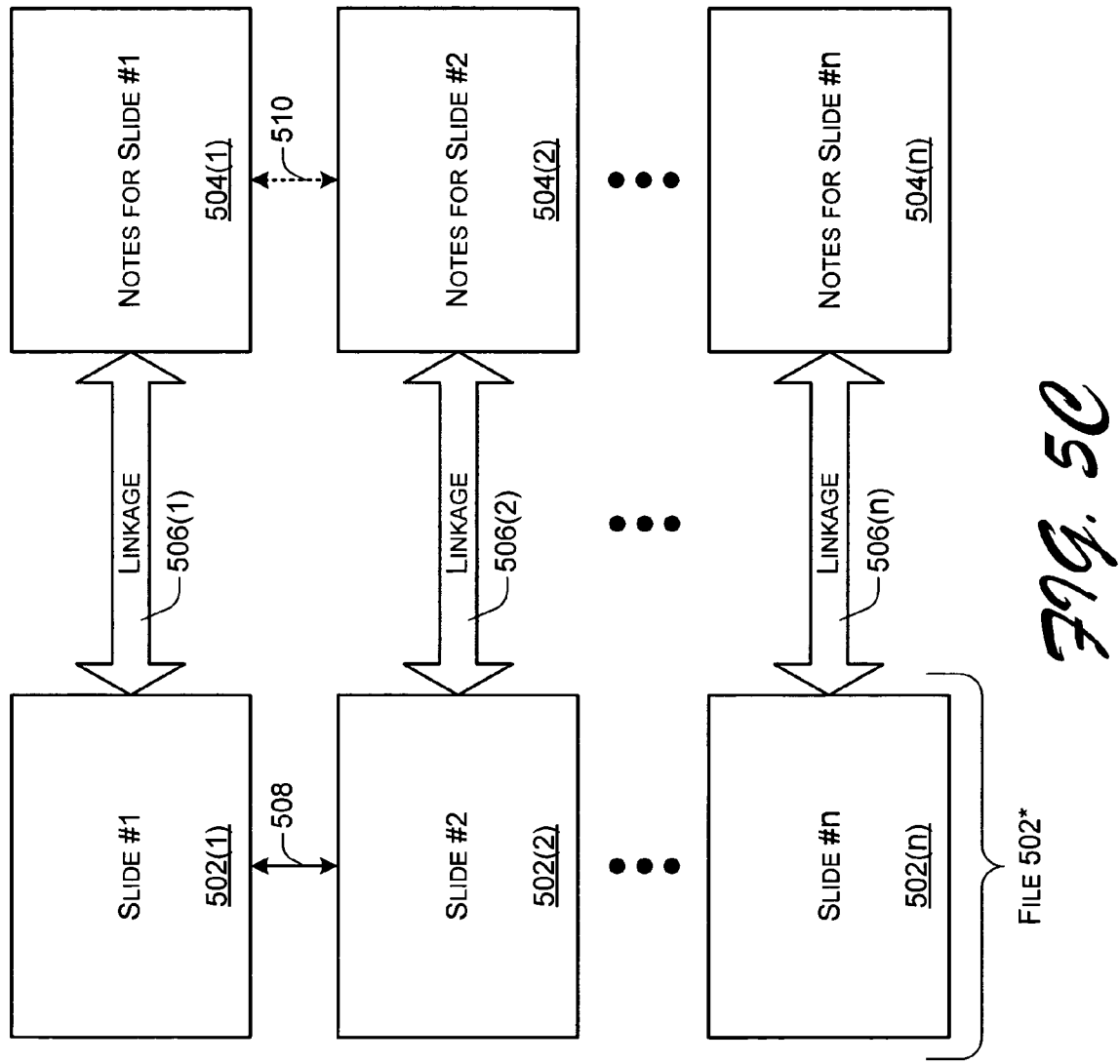
FIG. 5C illustrates a linkage enabling a synchronization between slides and associated notes for a note synchronization feature of an interactive application.

FIG. 5C illustrates a linkage 506 enabling a synchronization between slides 502 and associated notes 504 for a note synchronization feature of an interactive application 106. A file 502* includes multiple slides 502. Slide #1 502(1), slide #2 502(2) . . . slide #n 502(n) are illustrated along with associated respective notes for slide #1 504(1), notes for slide #2 504(2) . . . notes for slide #n 504(n).

More specifically, respective slides #1, #2 . . . #n 502(1, 2 . . . n) are associated with respective notes for slides #1, #2 . . . #n 504(1, 2 . . . n) via respective linkages 506(1), 506(2) . . . 506(n). The linkages 506 may be established and/or maintained by slideshow application 428 and/or notes synchronization module 312. Typically, slides 502 are (e.g., doubly) linked together in an intended display order as indicated by double arrow 508. Notes for slides 504 may also be (e.g., doubly) linked together in an intended display order as indicated by dashed double arrow 510; alternatively, their respective linkages 506 may be used for ordering purposes.

Figure 5D:
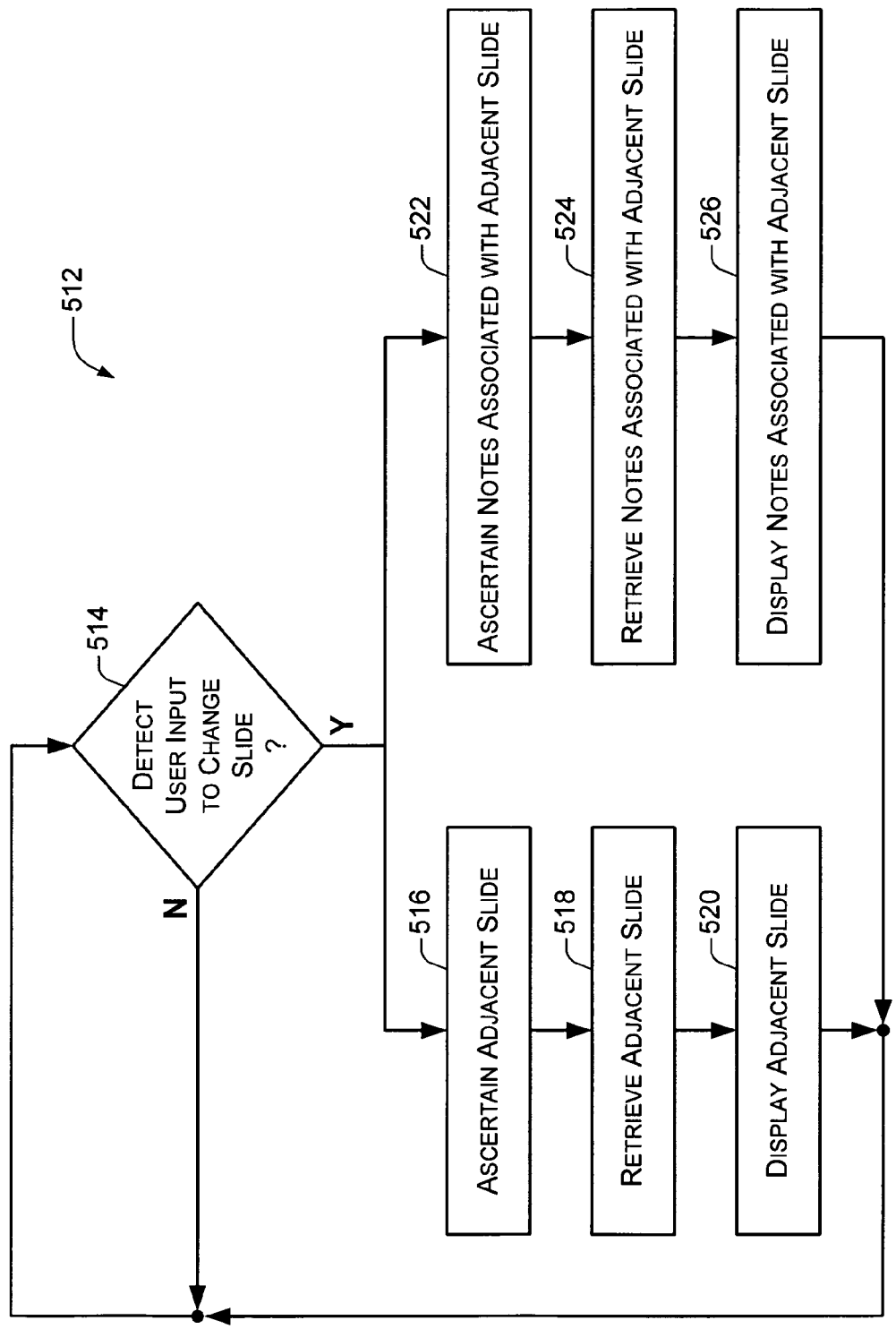
FIG. 5D is a flow diagram that illustrates an example of a method for synchronizing notes to associated slides during a presentation.

FIG. 5D is a flow diagram 512 that illustrates an example of a method for synchronizing associated notes to slides during a presentation. At block 514, it is determined if user input requesting a slide change has been detected. For example, interactive application 106 (e.g., integration module 310 and/or notes synchronization module 312) may detect that a presenter has pressed a forward or backward slide button 414. If not, then monitoring is continued to detect the pressing of a slide button.

If, on the other hand, user input to switch slides is detected (at block 514), then the method of flow diagram 512 continues at block 516. The actions of blocks 516-520 and those of blocks 522-526 may be performed sequentially or fully or partially simultaneously. At block 516, an adjacent slide is ascertained. For example, a next or previous (according to user input) adjacent slide 502 is ascertained according to a link 508 and/or using some mechanism of slideshow application 428. At blocks 518 and 520, the adjacent slide is retrieved and displayed. For example, the adjacent slide 502 may be retrieved from a file 502* of slides 502 and displayed in a sub-window 218 for slideshow application 428.

At block 522, a note that is associated with the (ascertained) adjacent slide is ascertained. For example, a linkage 506 for the adjacent slide 502 is used to ascertain a note for the adjacent slide 504. At block 524, the note associated with the adjacent slide is retrieved. For example, the note for the adjacent slide 504 may be extracted from the same file 502* having the associated slide 502 (e.g., especially if slideshow application 428 enables a presenter to add un-displayed notes to slides 502 during creation of the slideshow). Alternatively, the note for the adjacent slide 504 may be extracted from a separate file created and/or maintained by e.g. interactive application 106.

At block 526, the note associated with the adjacent slide is displayed. For example, the note for the adjacent slide 504 may be displayed in a sub-window 218 for slideshow application 428\*. These notes may be adjusted by the presenter to facilitate a seamless and/or more complete presentation as described below.

Figure 5E:
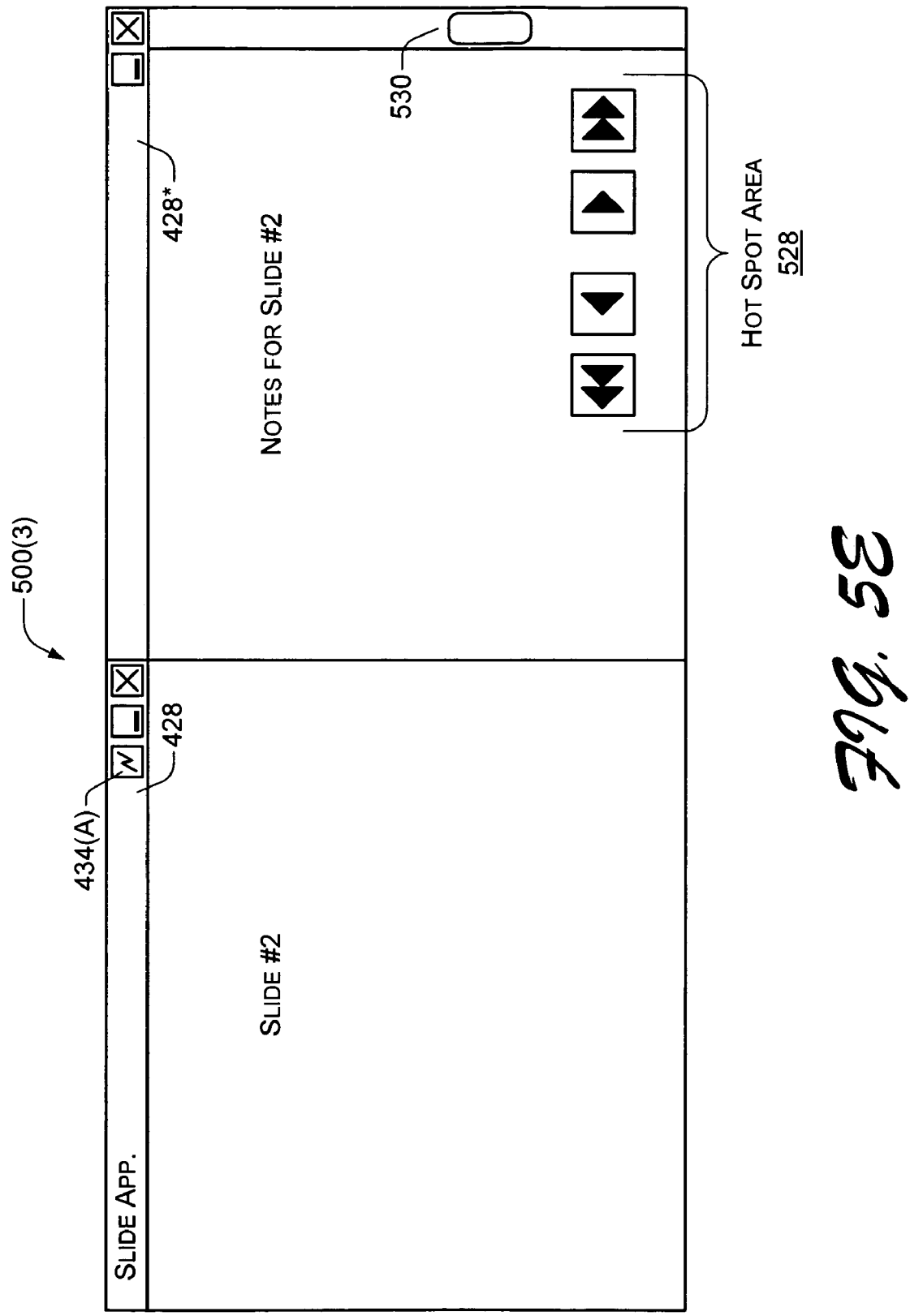
FIG. 5E illustrates a hot spot area that is an example of a control scheme for a note synchronization feature of an interactive application.

FIG. 5E illustrates a hot spot area 528 that is an example of a control scheme for a note synchronization feature of an interactive application 106. Screenshot 500(3) includes a sub-window 218 for slideshow application 428 and an associated sub-window 218 as indicated by 428\*. Slide #2 is displayed through slideshow application 428 and may be amended using slideshow application 428. Notes for slide #2 are displayed and may be updated through interactive application 106 in this example implementation.

In a described implementation, the text size of the notes prompt view is large for easy readability. However, the text size may be adjusted by the presenter. The presenter may directly read from the notes view, take cues from it, or use it to recall specific data points. The notes viewing portion may also be used like a teleprompter. By leaving the cursor over one of four hot spots of hot spot area 528, the presenter may choose to have the text scroll at automatic fast backward, slow backward, slow forward, and fast forward. The presenter may also scroll the text directly using a scrollbar 530.

Ink Animation Feature Examples of an Interactive Application

In a described implementation, an ink animation feature is provided by an ink animation module 314 of an interactive application 106. A presenter can draw on main window 216, and ink graphics that fall within a sub-window 218 that is selected for sharing are displayed to the audience members in sync. Communication module 316 is used when the sharing includes other processing devices 102 to transmit broadcast display data collected by display management component 206.

Figure 6B:
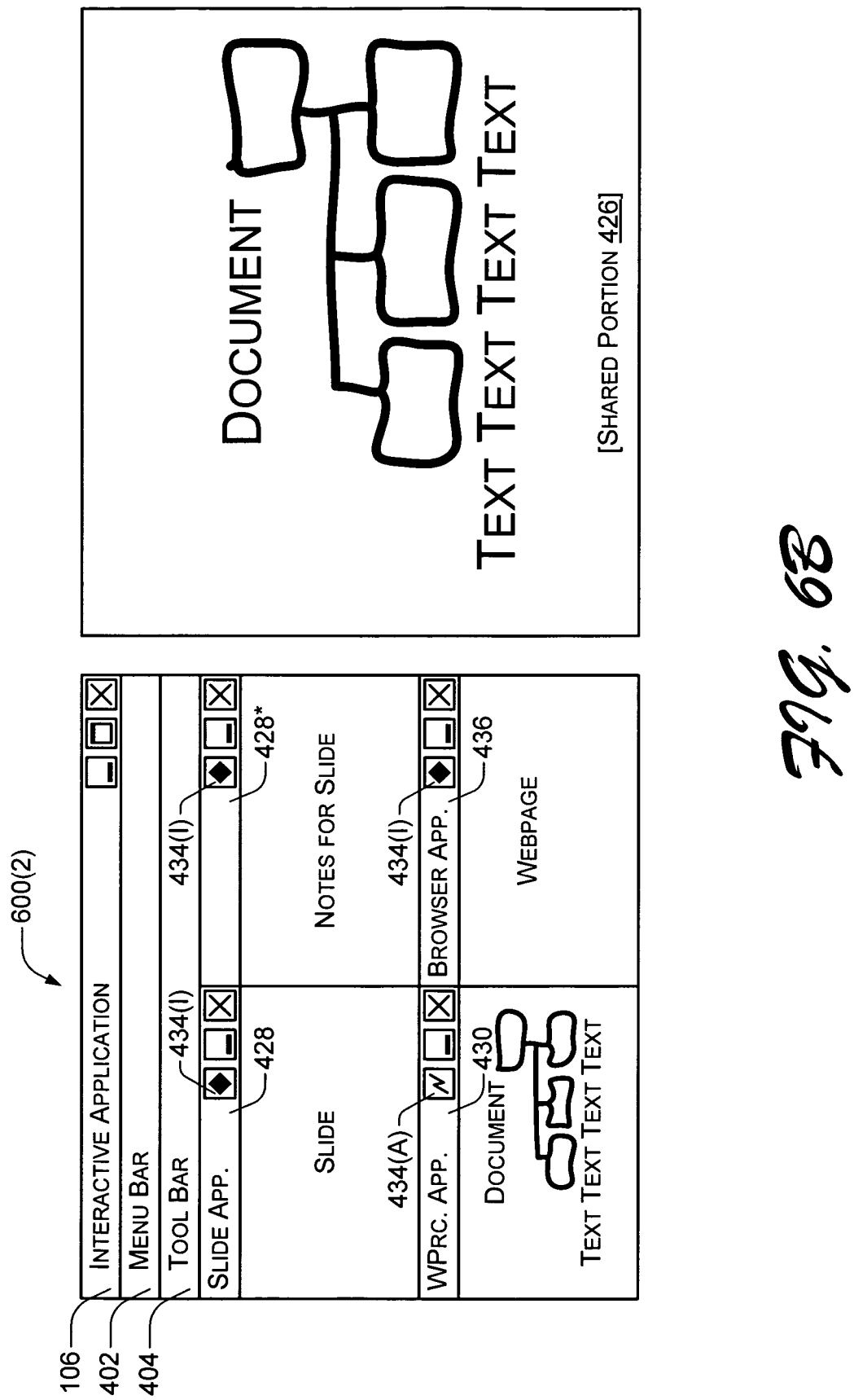
Figure 6C:
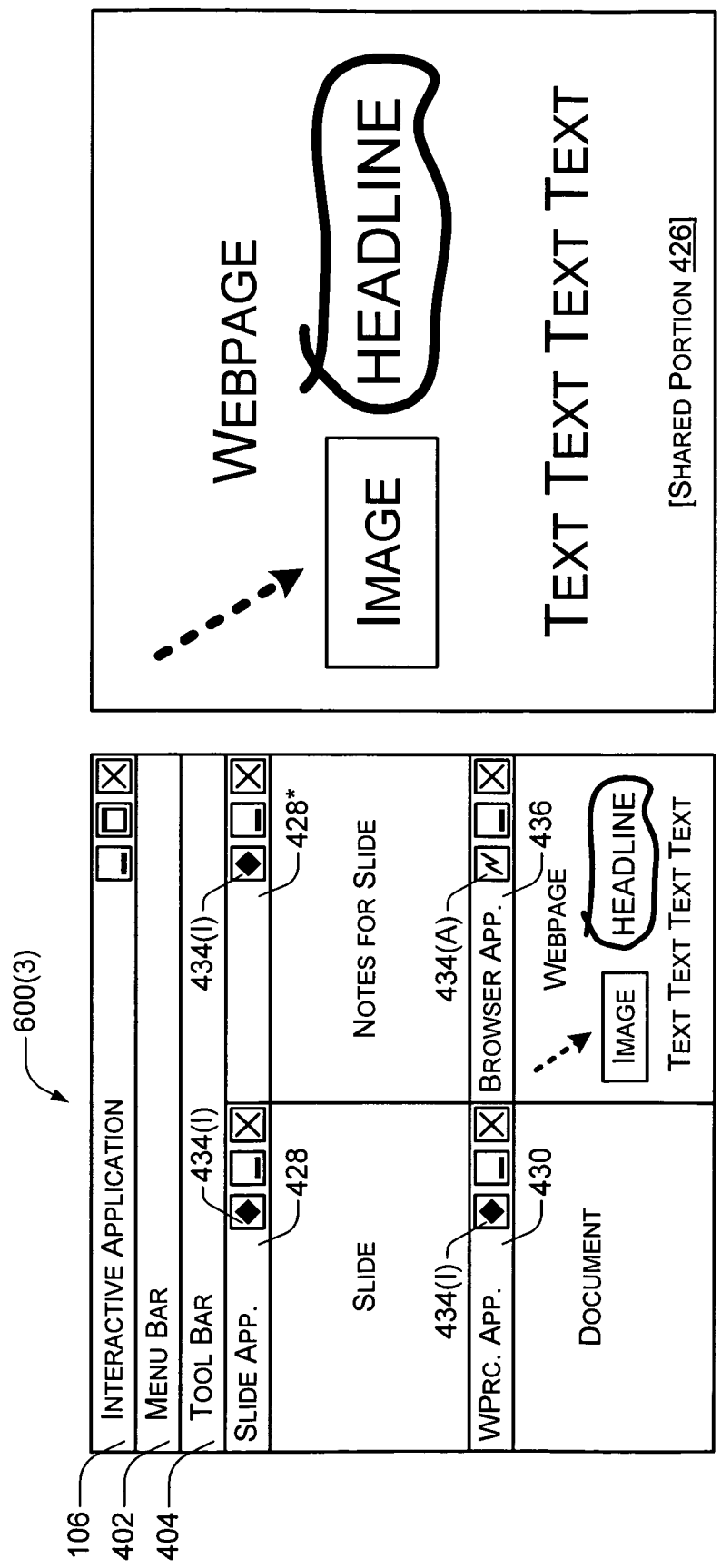

FIGS. 6A-6C illustrate examples of screenshots 600(1) to 600(3) for an ink animation feature of an interactive application 106. One use of ink is to create attention marks. Attention marks draw viewers' attention to specific content on slides or other displayed files. Examples of attention marks include: checks next to bullet points to indicate a current topic and an underlying of a current phrase.

Lecturers often have specific meanings in mind for different marks. For example, an instructor may annotate sequences by underlining terms to indicate progress, by adding a constant or repeating highlight, by circling key terms, and/or by using vertical bars to distinguish groups of terms. The use of attention marks can also refocus the audience's attention back to the slides, which makes the slides more central to the discussion.

At screenshot 600(1) of FIG. 6A, an underlining, a circling, and a question mark have been drawn on a slide of slideshow application 428 by a user. The question mark is formed from a dashed line, which may be selected using line style selection buttons 420. With share selection window control button 434 (A) being activated for slideshow application 428, the ink graphics are synchronously included on shared portion 426 for the audience to see.

At screenshot 600(2) of FIG. 6B, a diagram has been added to a document by the user. The width and color of the ink animation may be changed by the user with line style selection buttons 420 and color palette buttons 416. With share selection window control button 434(A) being activated for word processing application 430, the ink graphics are synchronously included on shared portion 426 for the audience to see.

Prepared slides are generally able to display diagrams. However, when discussing the slides, it is important to draw attention to details, such as by tracing a data path in an architectural diagram or by showing active nodes in a state diagram. The inking can serve the purpose of an animation, where a process is demonstrated with contemporaneous inking.

At screenshot 600(3) of FIG. 6C, ink animation has been added to a webpage by the user. The ink may be further animated with line style selection buttons 420. For example, the arrow may repeatedly point towards the "image" block, and the circling around the "headline" may change colors and/or blink. With share selection window control button 434(A) being activated for browser application 436, the ink graphics are synchronously included on shared portion 426 for the audience to see.

Peer-to-Peer Real-Time Communication Feature Examples of an Interactive Application In a described implementation, a (substantially) simultaneous distributed communication feature is provided by a communication module 316 of an interactive application 106 to realize peer-to-peer (P2P) real-time communication (RTC). Opened file contents from integration module 310 and ink animations made thereon from ink animation module 314 are shared to processing devices 102 using group management component 204 and display management component 206.

FIG. 7A illustrates an example of a group membership organizational tree 702 for a distributed communication feature of an interactive application 106. Organizational tree 702 may be visible, for example, in a window pane that is accessible at main window 216 of interactive application 106. Organizational tree 702 includes groups 704, members 706 belonging to each group 704, and presentations 708 corresponding to members 706. Thus, resources (e.g., presentations) may be organized into groups 704. A group 704 may have multiple group members 706, and each member 706 may have at least one shared presentation 708.

A user has the ability to choose which group 704 to enter and to choose in which group a presentation 708 is to be shared. In other words, a member 706 can enter different groups 704 and share different presentations 708 in each group 704. These groupings, and organizational tree 702 overall, is instituted (i.e., created and maintained) by group management component 204. For privacy purposes, viewing of a shared presentation 708 (including the title and/or existence thereof) can be confined to members 706 of the specified corresponding group 704.

The P2P RTC of communication module 316 enables the broadcast of presented content and the synchronization of ink. As described above especially with regard to share selection window control buttons 434, a user A/presenter can specify which sub-window's 218 content is shared. Another user B may click the user A's membership node 706 and/or presentation node 708 in organizational tree 702 to open a new sub-window 218 that displays the content shared by user A. The content is synchronized at regular intervals. Screenshots illustrating this content sharing are described below with reference to FIGS. 7B and 7C.

As noted above, for a P2P environment, a member's ink as well as file content is transferred between participating members. Thus, if user A marks ink at his or her processing device 102, the ink is displayed in sync on user B's desktop, and vice versa. A screenshot illustrating this content sharing is described below with reference to FIG. 7D.

Figure 7B:
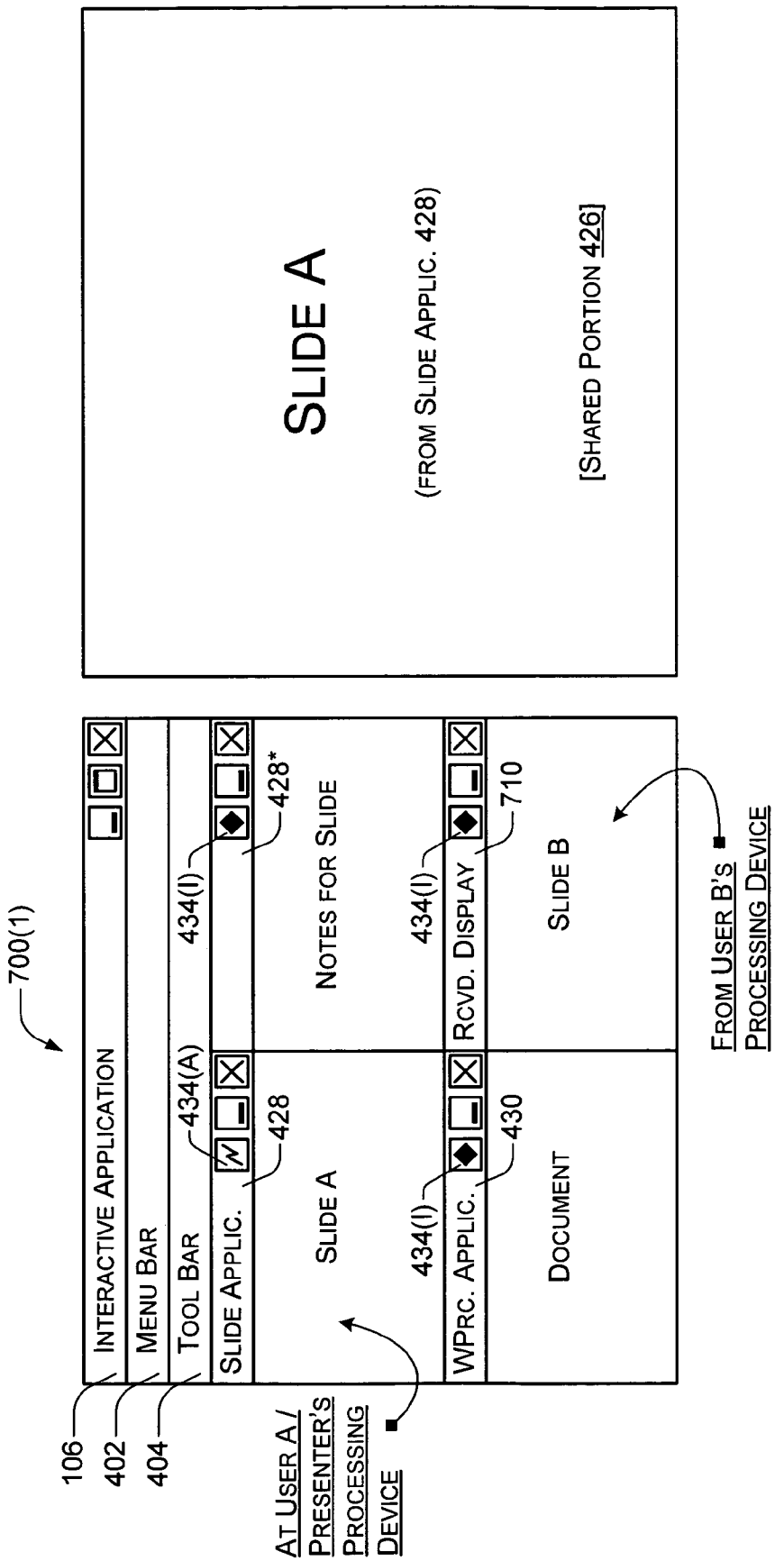
Figure 7C:
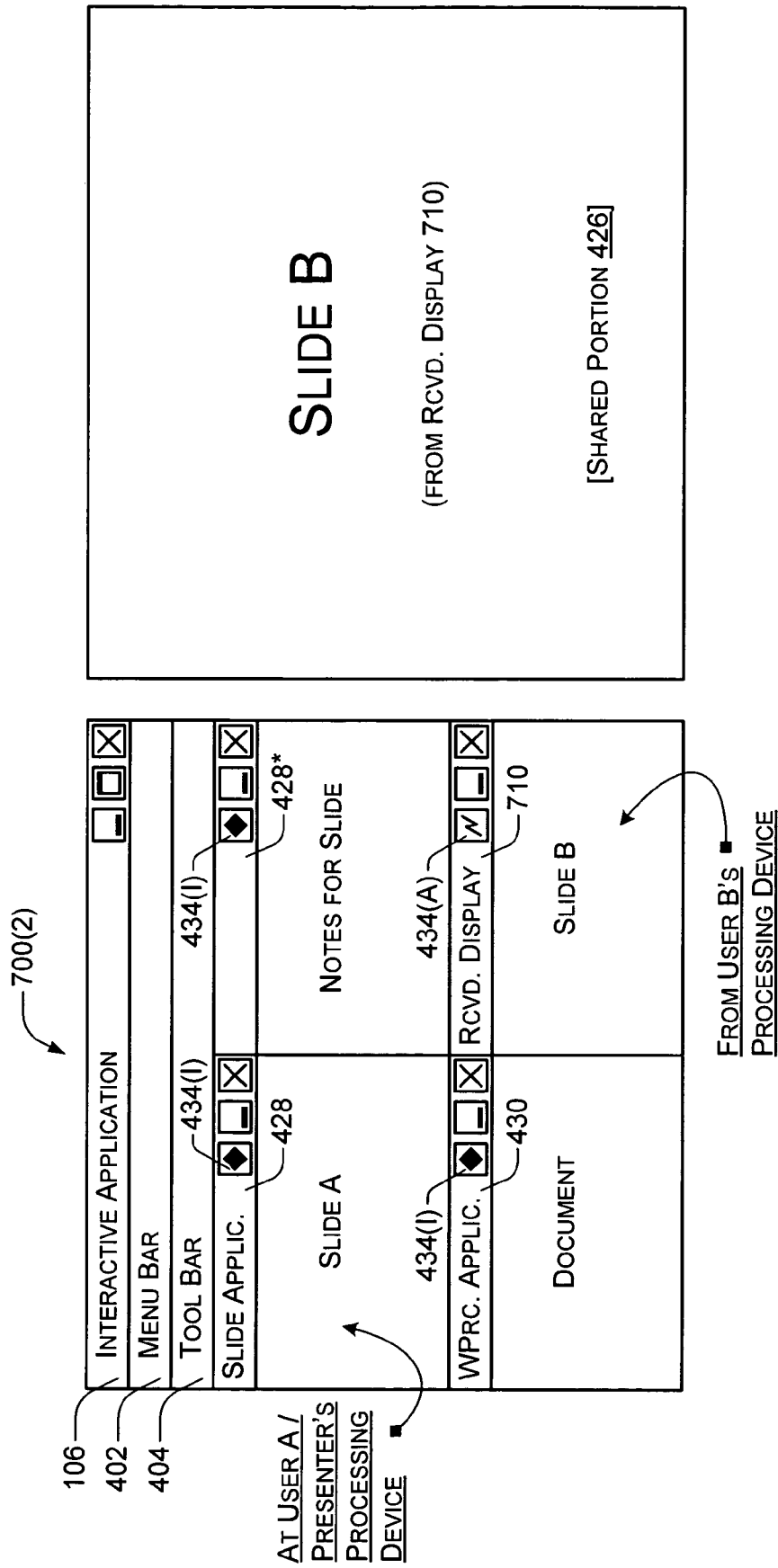

FIGS. 7B-7D illustrate examples of screenshots 700(1) to 700(3) for a distributed communication feature of an interactive application 106. At screenshot 700(1) of FIG. 7B, user A, who is the primary presenter, is providing slide content for a presentation. Specifically, user A is sharing slide A through slideshow application 428 as shared portion 426. User A is also receiving a slide B from user B's processing device 102 at received display 710. At screenshot 700(2) of FIG. 7C, user A has pressed share selection window control button 434(A) to activate the contents of received display 710 for sharing. Hence, slide B from user B becomes part of user A's presentation as slide B is shared as shared portion 426.

At screenshot 700(3) of FIG. 7D, user A and user B are employing ink animation to contribute to the presentation. As indicated by key 712, solid lines are drawn by user A, and dashed lines are drawn by user B. Both user A and user B have drawn ink graphics on slide A. Because the contents of slideshow application 428 has been selected for sharing, the line from user A and the triangle from user B are included as shared portion 426. Although not currently shared from user A's processing device 102, both user A and user B can also draw ink over slide B of received display 710.

Interactive application 106, especially when used in a distributed architecture mode, facilitates interactions between users. In meetings one or more users can write answers to questions raised by other audience members. With interactive application 106, the answer writing can be performed using an electronic whiteboard (e.g., a blank sub-window 218 from a productivity application 308 or interactive application 106) or by writing directly on slides.

Example Communication Implementation for
Interactive Applications

An example implementation of communications between and among interactive applications 106 is described in this section. These communications can relate to, for example, a general distributed communication feature, an ink animation feature, and so forth.

With reference to FIG. 7A, each given group 704 has a group administrator (not specifically indicated) that is the chief member 706 of the given group 704. The group administrator is responsible for maintaining a member registry (not shown) having information for group members 706 of the given group 704. Non-administrative members 706 thus register their information with the group administrator member 706, which maintains the member registry.

The member registry may be stored at a processing device 102 of the group administrator member 706 or at another location (e.g., a central server or database). The information registered for each new group administrator member 706 includes a member identifier or identification (ID), a network connection, and a network address (e.g., an internet protocol (IP) address). This information is provided by the new member 706 to the group administrator member 706, and the group administrator member 706 adds the information to the member registry. This information that is stored in the member registry is used in the process of distributing screenshots and ink data.

Distributed Communication of Screenshots

An active member (not specifically indicated in FIG. 7A) is the member 706 who is sharing content (e.g., "Presentation 1" 708) to other group members 706. Optionally, an active member indicator (not shown) may be presented on display screen 108. For example, with reference to FIG. 7B, an active member indicating icon or button may be presented next to active share selection window control button 434(A) in the sub-window 218 of slideshow application 428 or next to window control buttons 412 of main window or console area 216 of interactive application 106.

The application content data that is shared from an active member 706 with other group members 706 is a screenshot image of the selected sub-window 218. First, at a predetermined frequency, a screenshot of the area of the selected project-out sub-window 218 is taken. In other words, a display portion 108 that is to be shared is screenshot at a specific frequency. This predetermined specific frequency may be, for example, once a second, every five seconds, once a minute, and so forth. If the user changes the selected active sub-window 218, the screenshot area is changed accordingly.

Second, the screenshot is saved as an image data structure. The image data structure may be, for example, a bitmap image, a JPEG image, and so forth. Optionally, the image data structure may be compressed to facilitate storage and/or transmission.

Third, the image data structure is distributed from a processing device 102 of the active member 706 to processing devices 102 of other group members 706. This distribution may be effectuated at the same predetermined frequency to realize a synchronization display feature at multiple terminations.

Alternatively, a previously-saved screenshot may be compared to a currently-taken screenshot. If there is a difference between the two (i.e., the displayed application content has changed), then the currently-taken screenshot is distributed. Otherwise, if the screenshots are identical, the image data structure distribution may be omitted, at least until the next screenshot is taken at the predetermined frequency.

Distributed Communication of Ink

As described herein above and with reference to FIG. 7D, ink applied to a selected active sub-window 218 of the active member 706 is distributed to other members 706 of the corresponding group.

In a first step, ink is collected. More specifically, at least the ink that is drawn on a selected active sub-window 218 is collected. In a described implementation, an ink layer is applied to and covers the application content displayed in a sub-window 218. This upper ink layer is responsible for capturing the user's ink data and saving the data in order to collect the ink. The ink may be stored in an ink layer object (e.g., in an 'InkOverlay' object).

In a second step, an ink update is broadcast. When a user makes an ink drawing on the ink layer, this drawing event activates a drawing event processing function. The drawing event processing function captures the ink update data and saves it in the ink layer object as noted in the first step. The drawing event processing function also transmits an ink update message to other members 706 of the corresponding group 1. The ink update message includes the originating active member 706 that is sending the message and the ink update data.

In a third step, the ink drawings are updated synchronously. After receiving the broadcasted ink update message, each member 706 terminator processing device 102 determines whether there is an opened sub-window 218 associated with the received ink update data. In other words, it is determined if there is displayed application content on which the received ink update data is to be overlain to synchronize display portion 108 of an active member 706 with display portion 108 of the terminating processing device 102. If yes, the associated application content is currently being displayed in a sub-window 218, then the ink update data is reflected in that sub-window 218.

FIG. 7E illustrates example display screens of an interactive application for members A and B who are sharing content. Screenshot 700(4A) shows an interactive application 106 for member A, and screenshot 700(4B) shows an interactive application 106 for member B. At member A's processing device 102, slideshow application 428 is displaying slide A3, and ink has been drawn thereon. This slide A3, as well as the ink overlaid thereon, is synchronously reproduced at received display 710B at member B's processing device 102.

At member B's processing device 102, slideshow application 428 is displaying slide B7, and ink has been drawn thereon. This slide B7, as well as the ink overlaid thereon, is synchronously reproduced at received display 710A at member A's processing device 102. An example messaging format for exchanging ink update data is described further herein below. As shown, the ink update data is reciprocally reflected by reproducing the visual effect originally created by the respective active members 706.

In an alternative implementation, screenshots and ink data may be distributed together by binding one with the other. The ink update data captured by the ink layer is bound with a screenshot of the underlying sub-window 218 under the ink layer. The bound data can then be broadcast together. Thus, the drawn ink and the underlying screenshot of the selected sub-window 218 are distributed together and may be presented together at a display screen 104 at the receiver.

Example Communication Approaches, Protocols, and Formats

Information is communicated between and among different processing devices 102 using messages. One or more different types of messages may be defined and/or utilized. In a described implementation, each message includes sender/originating ID, receiver/destination ID, and the message content data. An example message format structure is:

| Sender ID | Receiver ID | Content Data |
| --- | --- | --- |

The content data can be ink update data or screenshot update data depending on whether the message is an ink update message or a screenshot update message, respectively. The content data may also comprise both ink update data and screenshot update data when they are bound together.

In an example P2P implementation, the P2P communication is based on a registry and message system. Message component 208 packs and unpacks the data for the messages. As described above, the member registry maintains the location and address information of members 706 of a group 704. The member registry is stored at the terminator/processing device 102 of the group administrator member 706. The system (e.g., each interactive application 106) can ascertain group membership from the member registry and also extract therefrom network address locations to determine where to send the data.

The message distribution process differs in two example instances. In a first instance, the active member is also the group administrator. When the active member is also the group administrator, the processing device 102 thereof directly acquires the member information of the other group members from the member registry. The processing device 102 of the group administrator then distributes the screenshot image data and/or ink data to the other members. This first instance is graphically represented as follows:

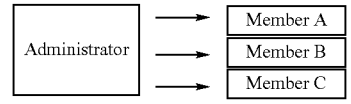

In a second instance, on the other hand, the active member is not the group administrator. When the active member is not the group administrator, the processing device 102 thereof first sends the message to the group administrator. The processing device 102 of the group administrator then distributes the data to other members based on the information about the other group members in the member registry. This second instance is graphically represented as follows:

Alternatively, the member registry can be sent from the group administrator member to the active member upon request or automatically upon becoming active so that the group administrator need not be involved in communicating every message. This approach can reduce the likelihood of the group administrator becoming a bottleneck, especially if there are multiple active members simultaneously sharing content in a single group.

In an example TCP/IP implementation, messages are transferred via the network layer. From the member registry, the network layer acquires the destination's IP address and sends the message via a socket connection.

Upon receipt of a message at the destination processing device 102, the message is unpacked and forwarded to display component 206. Firstly, it identifies the message type. If it is not a screenshot message or an ink update message, it is processed in the background. Otherwise, display component 206 identifies the origin member from which the data was sent. If there is an opened sub-window 218 for displaying the received screenshot and/or ink data from the sending member, display component 206 displays the screenshot first and thereafter repaints the ink data thereon in an ink layer.

The devices, actions, aspects, features, procedures, components, screenshots, etc. of FIGS. 1-7E are illustrated in diagrams that are divided into multiple windows, blocks, or other portions. However, the order, interconnections, interrelationships, layout, etc. in which FIGS. 1-7E are described and/or shown is not intended to be construed as a limitation, and any number of the windows, blocks, or other portions can be modified, combined, rearranged, augmented, omitted, etc. in any manner to implement one or more systems, methods, devices, procedures, media, apparatuses, arrangements, etc. for presentation facilitation implementations. Furthermore, although the description herein includes references to specific implementations, the illustrated and/or described implementations can be implemented in any suitable hardware, software, firmware, or combination thereof and using any suitable device architecture(s), GUI(s), network communication protocol(s), man-machine interface(s), display mechanism(s), and so forth.

Although systems, media, devices, methods, procedures, apparatuses, techniques, schemes, approaches, procedures, arrangements, and other implementations have been described in language specific to structural, logical, algorithmic, visual, and functional features and/or diagrams, it is to be understood that the invention defined in the appended claims is not necessarily limited to the specific features or diagrams described. Rather, the specific features and diagrams are disclosed as exemplary forms of implementing the claimed invention.

What is claimed is:

1. One or more processor-accessible storage media comprising processor-executable instructions that, when executed, direct a device to produce on a display screen items comprising:
   a main window of an interactive application for integrating multiple different productivity applications into respective sub-windows of the main window of the interactive application;
   a first sub-window residing within the main window of the interactive application displaying: (i) first content associated with a first productivity application in response to receiving a selection of the first productivity application and a selection of a file associated with the first productivity application, and (ii) a first window control button, the first window control button being selectable by a user to toggle between at least an active state and an inactive state, wherein the first content is shared with one or more other devices when the first window control button is in an active state and the first content is not shared when the first window control button is in an inactive state; and
   a second sub-window adjacent to the first sub-window and residing within the main window of the interactive application displaying: (i) second content associated with a second productivity application in response to receiving a selection of the second productivity application and a selection of a file associated with the second productivity application, the second productivity application differing from the first productivity application, and (ii) a second window control button, the second window control button being selectable by the user to toggle between at least an active state and an inactive state, wherein the second content is shared with one or more other devices when the second window control button is in an active state and the second content is not shared when the second window control button is in an inactive state.

2. The one or more processor-accessible storage media as recited in claim 1, wherein the first and second productivity applications comprise different productivity applications selected from a group of productivity applications comprising: a word processing application, a slide presentation application, an email and/or schedule management application, a web browsing application, an art/drawing application, and a music/movie playing/creating application.

3. The one or more processor-accessible storage media as recited in claim 1, wherein the processor-executable instructions, when executed, enable the user to access the first content and the second content utilizing features that are provided by the first productivity application and the second productivity application, respectively.

4. The one or more processor-accessible storage media as recited in claim 1, wherein the processor-executable instructions, when executed, provide a console view overlay for the first productivity application and for the second productivity application.

5. The one or more processor-accessible storage media as recited in claim 1, wherein the processor-executable instructions, when executed, provide a console view overlay for the first content in the first sub-window and for the second content in the second sub-window.

6. The one or more processor-accessible storage media as recited in claim 1, wherein the processor-executable instructions, when executed, direct the device to produce on the display screen further items comprising:
   a third sub-window adjacent to the first sub-window and residing within the main window of the interactive application displaying third content associated with a third productivity application in response to receiving a selection of the third productivity application and a selection of a file associated with the third productivity application, the third productivity application differing from the first and second productivity applications; and
   a fourth sub-window adjacent to the second and third sub-window and residing within the main window of the interactive application displaying fourth content associated with a fourth productivity application in response to receiving a selection of the fourth productivity application and a selection of a file associated with the fourth productivity application, the fourth productivity application differing from the first, second and third productivity applications.

7. The one or more processor-accessible storage media as recited in claim 1, wherein the processor-executable instructions, when executed, enable user selection of a sub-window for sharing with a menu-based interface.

8. The one or more processor-accessible storage media as recited in claim 1, wherein the one or more other devices comprise a display projection device.

9. The one or more processor-accessible storage media as recited in claim 1, wherein the one or more other devices comprise a processing device running the interactive application, the interactive application capable of causing the processing device to display content from the selected sub-window that is being shared by the device.

10. The one or more processor-accessible storage media as recited in claim 1, wherein the processor-executable instructions, when executed, cause the device to take a screenshot of the content displayed in the sub-window that is selected for sharing.

11. The one or more processor-accessible storage media as recited in claim 10, wherein the processor-executable instructions, when executed, cause the device to take new screenshots of the content at a predetermined frequency.

12. The one or more processor-accessible storage media as recited in claim 10, wherein the processor-executable instructions, when executed, cause the device to transmit the screenshot to the one or more other devices, the one or more other devices comprising at least one of a group administrator or a group member.

13. The one or more processor-accessible storage media as recited in claim 1, wherein the processor-executable instructions, when executed, cause the device to create an ink layer over at least the first sub-window.

14. The one or more processor-accessible storage media as recited in claim 13, wherein the processor-executable instructions, when executed, cause the device to capture ink drawn in the ink layer over at least the first sub-window and store the captured ink in an ink layer object.

15. The one or more processor-accessible storage media as recited in claim 13, wherein the processor-executable instructions, when executed, cause the device to transmit ink collected from the ink layer to at least one of a group administrator or a group member.

16. One or more processor-accessible storage media comprising processor-executable instructions that, when executed, direct a device to establish a graphical user interface (GUI) capable of presenting:
- (i) a main window of an interactive application for integrating multiple different productivity applications into respective sub-windows of the main window of the interactive application;
- (ii) a first sub-window residing within the interactive application displaying first content associated with a first productivity application in response to receiving a selection of the first productivity application and a selection of a file associated with the first productivity application, the first sub-window being associated with a first share selection window control button; and
- (iii) a second sub-window adjacent to the first sub-window and residing within the interactive application displaying second content from a second productivity application in response to receiving a selection of the second productivity application and a selection of a file associated with the second productivity application, the second productivity application differing from the first productivity application and the second sub-window being associated with a second share selection window control button;
- and wherein the GUI enables a user to select a sub-window for sharing the displayed content in the selected sub-window with group members by selecting a share selection window control button corresponding to the selected sub-window.

17. The one or more processor-accessible storage media as recited in claim 16, wherein the GUI is capable of presenting the first sub-window and the second sub-window in an integrated console view, the integrated console view comprising the main window of the interactive application, the main window enclosing the first sub-window and the second sub-window.

18. The one or more processor-accessible storage media as recited in claim 17, wherein the integrated console view includes a window or pane that identifies file types that can be opened within the integrated console view.

19. The one or more processor-accessible storage media as recited in claim 17, wherein the integrated console view includes a window or pane that presents a group membership organizational tree, the group membership organizational tree indicating the group members to which the selected sub-window may be shared.

20. The one or more processor-accessible storage media as recited in claim 16, wherein the GUI includes color palette buttons and line style selection buttons; wherein a user is enabled to draw graphics on the first sub-window in colors and line styles that are dependent on activated ones of the color palette buttons and the line style selection buttons, respectively; and wherein the drawn graphics are shared with the group members.

21. The one or more processor-accessible storage media as recited in claim 16, wherein a snapshot of the selected sub-window, which is selected for sharing by the corresponding share selection window control button, is transmitted to the group members in order to share content from the selected sub-window.

22. An arrangement for presentation facilitation on a device, the arrangement comprising:
- integration means for integrating displayed content from multiple different productivity applications into respective sub-windows of a main window of an interactive application and for integrating share selection window control buttons corresponding to each of the multiple different productivity applications displaying content into respective sub-windows of the main window, wherein each of the respective sub-windows are adjacent to at least one sub-window and each of the respective sub-windows resides within the main window of the interactive application, wherein each of the share selection window control buttons are selectable by a user to share corresponding displayed content, and wherein the integration means integrate the displayed content from the multiple different productivity applications in response to receiving, for each of the respective sub-windows of the main window: (i) a selection of a file type or a productivity application, and (ii) a selection of a file having the selected file type or appropriate for the selected productivity application;
- grouping means for managing interaction between and among group members; and
- display means for managing synchronous updates of displayed content data being sent to and received from the group members, wherein the display means send, to the group members, displayed content data in response to the user selecting a share selection window control button corresponding to at least one of the multiple different productivity applications.

23. The arrangement as recited in claim 22, wherein the grouping means includes information regarding each member of each group and is capable of determining at least one destination for displayed content update data.

24. The arrangement as recited in claim 22, wherein the group members comprise member termination devices, and wherein the display means is adapted (i) to synchronize local shared presentations with corresponding member termination devices and (ii) to update a local display sub-window corresponding to received synchronization data from a member termination device.

25. The arrangement as recited in claim 20, wherein the display means comprises:
- change means for monitoring changes to a display of a particular sub-window;
- capture means for capturing a displayed image from the particular sub-window;
- retrieval means for retrieving from the grouping means group member information for a group corresponding to the particular sub-window; and
- forwarding means for passing the captured displayed image and the group member information to a messaging layer.

26. The arrangement as recited in claim 22, wherein the arrangement comprises at least one of (i) one or more processor-accessible media or (ii) at least one device.

27. A device comprising:
- at least one processor; and
- one or more media including processor-executable instructions that are capable of being executed by the at least one processor, the processor-executable instructions adapted to direct the device to perform actions comprising:
  - establishing a main window of an interactive application for integrating multiple different productivity applications into respective sub-windows of the main window of the interactive application;
  - opening first content associated with a first productivity application in a first sub-window residing within the main window of the interactive application responsive to receiving a selection of the first productivity application and a selection of a file associated with the first productivity application, the first sub-window being associated with a first share selection window control button that is selectable by a user to share the first content;

opening second content associated with a second productivity application that differs from the first productivity application in a second sub-window adjacent to the first sub-window and residing within the main window of the interactive application responsive to receiving a selection of the second productivity application and a selection of a associated with the second productivity application, the second sub-window being associated with a second share selection window control button that is selectable by the user to share the second content;

detecting selection of a sub-window residing within the main window of the interactive application for sharing by detecting selection of a corresponding share selection window control button; and forwarding the content being displayed in the selected sub-window.

28. The device as recited in claim 27, wherein the action of forwarding comprises an action of broadcasting the content as a screenshot to at least one group member in accordance with group membership organizational information.

29. The device as recited in claim 27, wherein the processor-executable instructions are adapted to cause the device to perform further actions comprising:

collecting ink drawn over the selected sub-window; and broadcasting the collected ink to at least one group member in accordance with group membership organizational information.

30. The device as recited in claim 27, wherein the processor-executable instructions are adapted to cause the device to perform further actions comprising:

receiving an ink update message having ink update data;

determining if content to which the ink update data corresponds is currently being displayed in a sub-window; and if so, synchronizing the ink drawn over the corresponding content with the ink update data.

31. The device as recited in claim 27, wherein the processor-executable instructions are adapted to cause the device to perform further actions comprising:

joining a membership group;

requesting to view a resource being shared by a member of the membership group; and displaying the resource in a third sub-window of the main window.

* * * * *

UNITED STATES PATENT AND TRADEMARK OFFICE
CERTIFICATE OF CORRECTION

| | | |
|---|---|---|
| PATENT NO. | : 7,640,502 B2 | Page 1 of 1 |
| APPLICATION NO. | : 10/957037 | |
| DATED | : December 29, 2009 | |
| INVENTOR(S) | : Ying-Qing Xu et al. | |

It is certified that error appears in the above-identified patent and that said Letters Patent is hereby corrected as shown below:

In column 22, line 37, in Claim 25, delete "claim 20," and insert -- claim 22, --, therefor.

In column 23, line 11, in Claim 27, before "associated" insert -- file --.

Signed and Sealed this
Seventeenth Day of April, 2012

David J. Kappos
*Director of the United States Patent and Trademark Office*